US012792537B1

(12) United States Patent
Woods et al.

(10) Patent No.: US 12,792,537 B1
(45) Date of Patent: Nov. 10, 2026

(54) SYSTEMS AND METHODS FOR AN ADAPTIVE FEEDBACK LOOP FOR DISTRIBUTED INPUT PROCESSING AND ALIGNMENT PRIORITIZATION IN RESPONSE TO SYSTEM-LEVEL CHANGES

(71) Applicant: AI Leadership Labs, LLC, Austin, TX (US)

(72) Inventors: Geoff Woods, Austin, TX (US); Randall Joseph Ottinger, Bellevue, WA (US)

(73) Assignee: AI Leadership Labs, LLC, Austin, TX (US)

( * ) Notice: Subject to any disclaimer, the term of this patent is extended or adjusted under 35 U.S.C. 154(b) by 21 days.

(21) Appl. No.: 19/305,001

(22) Filed: Aug. 20, 2025

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC .............................. G06F 13/20; G06F 2213/40
See application file for complete search history.

(56) References Cited

U.S. PATENT DOCUMENTS 11,689,432 B1 6/2023 Bhattacharjee et al.
12,175,968 B1 * 12/2024 AbdelHady ......... G10L 15/1815
12,430,495 B2 * 9/2025 Lee ..................... G06F 16/3335
2024/0146825 A1 * 5/2024 Ferreira .................. H04L 67/60
2024/0419921 A1 * 12/2024 Barrow ................... G06F 40/40
2025/0068666 A1 * 2/2025 Maheshwari ......... G06F 16/335
2025/0192980 A1 * 6/2025 Patil ....................... G06F 16/254
2025/0209345 A1 * 6/2025 Sivakumar ........... G06N 3/0985
2025/0225402 A1 * 7/2025 Gross ........................ G06N 3/09
2025/0231947 A1 * 7/2025 Files ................. G06F 16/24568
2025/0238629 A1 * 7/2025 Malkiel ................. G06F 40/194
2025/0252268 A1 * 8/2025 Rossi ................... G06N 3/0895
2025/0272505 A1 * 8/2025 Thirukazhukundram .................. G06F 40/40
2025/0285352 A1 * 9/2025 Xu ........................ G06F 16/438
2025/0285471 A1 * 9/2025 Sivakumar ............. G06V 10/82
2025/0315458 A1 * 10/2025 Clancy .................. G06F 16/906
2025/0322274 A1 * 10/2025 Voonna .................... G06N 5/04

FOREIGN PATENT DOCUMENTS

IN 202511040598 A 5/2025
IN 202541043098 A 5/2025

* cited by examiner

*Primary Examiner* — Henry Tsai
*Assistant Examiner* — Aurangzeb Hassan
(74) *Attorney, Agent, or Firm* — Caldwell LLC

(57) ABSTRACT

A system configured to detect a system change event, generate, using a query engine, a context-sensitive query to be issued to at least one user node as a function of detecting the system change event, receive, from the at least one user node, an input response as a function of the context-sensitive query, process the input response using a natural language processing model, combining a plurality of contextual representations using an integration engine to form an integrated representation, and generate a structured feedback object as a function of the integrated representation, wherein the structured feedback object includes at least one response cluster.

16 Claims, 9 Drawing Sheets

200b

SYSTEMS AND METHODS FOR AN ADAPTIVE FEEDBACK LOOP FOR DISTRIBUTED INPUT PROCESSING AND ALIGNMENT PRIORITIZATION IN RESPONSE TO SYSTEM-LEVEL CHANGES

FIELD OF THE INVENTION

The present invention generally relates to the field of adaptive feedback modeling in computing systems. In particular, the present invention is directed to systems and methods for an adaptive feedback loop for distributed input processing and alignment prioritization in response to system-level changes.

BACKGROUND

Modern computing environments are frequently affected by system-level changes, such as updates to software, workflows, policies, or access privileges. These changes can produce complex and distributed impacts that are difficult to trace using standard performance metrics or system logs. Individuals interacting with the system often experience the consequences of such changes first-hand, but capturing their feedback is challenging, particularly when it is unstructured, delayed, or varies across user roles and locations. Technical barriers remain in systematically collecting, interpreting, and prioritizing this user-side input in a way that reflects its broader relevance to system behavior. Accordingly, there is a need for systems that can surface and structure feedback from distributed users in response to operational changes, enabling more responsive and aligned system adaptation.

SUMMARY OF THE DISCLOSURE

In some aspects, the techniques described herein relate to a system for an adaptive feedback loop for distributed input processing and alignment prioritization in response to system-level changes, the system including: at least a processor and a memory communicatively connected to the at least a processor, the memory containing instructions configuring the at least a processor to: detect a system change event, generate, using a query engine, a context-sensitive query to be issued to at least one user node as a function of detecting the system change event, receive, from the at least one user node, an input response as a function of the context-sensitive query, process the input response using a natural language processing model, wherein processing the input response includes: normalizing the input response and segmenting a textual input of the input response into a sequence of units, converting the sequence of units into a sequence of embeddings using an embedding layer, and passing the sequence of embeddings through at least one layer of a language model to generate a contextual representation of the textual input of the input response, combining a plurality of contextual representations using an integration engine to form an integrated representation, and generate a structured feedback object as a function of the integrated representation, wherein the structured feedback object includes at least one response cluster.

In some aspects, the techniques described herein relate to a method for an adaptive feedback loop for distributed input processing and alignment prioritization in response to system-level changes, the method including: detecting, using at least a processor, a system change event, generating, using at least a processor and a query engine, a context-sensitive query to be issued to at least one user node as a function of detecting the system change event, receiving, by the at least a processor and from the at least one user node, an input response as a function of the context-sensitive query, processing, using the at least a processor, the input response using a natural language processing model, wherein processing the input response includes: normalizing the input response and segmenting a textual input of the input response into a sequence of units, converting the sequence of units into a sequence of embeddings using an embedding layer, and passing the sequence of embeddings through at least one layer of a language model to generate a contextual representation of the textual input of the input response, combining, using the at least a processor, a plurality of contextual representations using an integration engine to form an integrated representation, and generating, using the at least a processor, a structured feedback object as a function of the integrated representation, wherein the structured feedback object includes at least one response cluster.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for adaptively generating, processing, and prioritizing distributed user input in response to system-level changes using natural language processing (NLP) and machine learning techniques. In an embodiment, a processor may detect a system change event, generate a context-sensitive query, receive a user response, process the response using a language model, and generate a structured feedback representation comprising clustered user sentiment data.

Aspects of the present disclosure can be used to dynamically assess system state impact based on contextualized user-generated feedback. Aspects of the present disclosure can also be used to surface prioritized feedback clusters within an interactive interface for use in real-time monitoring or computational analysis. This is so, at least in part, because the system includes an aggregation and ranking engine capable of transforming distributed textual input into structured clusters scored by salience or urgency.

Aspects of the present disclosure allow for scalable integration of NLP-driven feedback processing pipelines in systems where event-triggered sentiment assessment or misalignment detection is desired. Exemplary embodiments illustrating aspects of the present disclosure are described below in the context of several specific examples.

Figure 1:
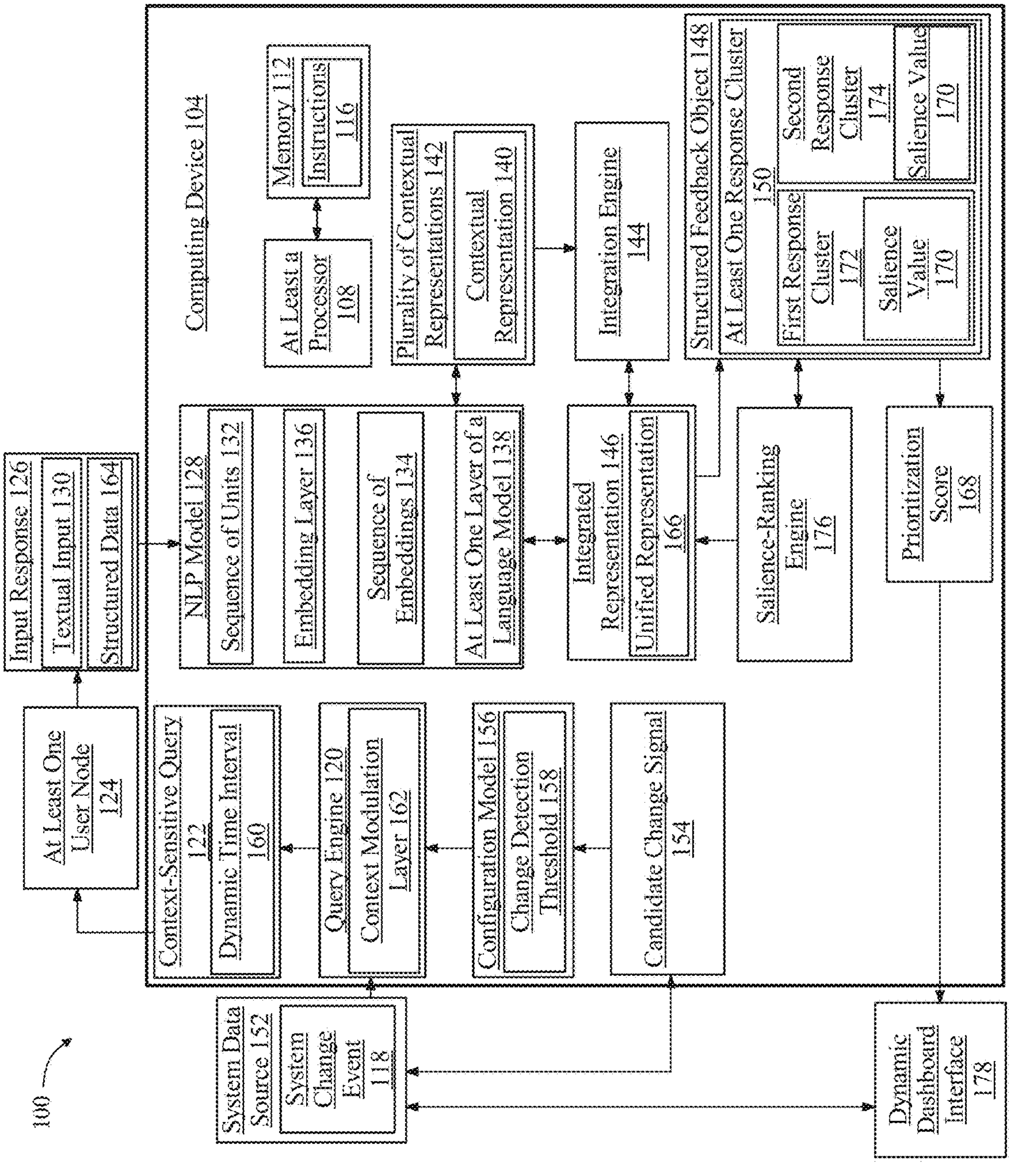
FIG. 1 is a block diagram of an exemplary embodiment of a system for an adaptive feedback loop for distributed input processing and alignment prioritization in response to system-level changes.

Referring now to FIG. 1, an exemplary embodiment of system 100 for an adaptive feedback loop for distributed input processing and issue prioritization in response to system-level changes is illustrated. System 100 may include circuitry such as without limitation at least a processor 108 communicatively connected to a memory 112, memory 112 containing instructions 116 configuring at least a processor 108 to initiate one or more tasks as described throughout this disclosure; for instance, circuitry may include and/or be included in a computing device. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In continued reference to FIG. 1, in an embodiment, at least a processor 108 may be configured to detect a system change event 118. For purposes of this disclosure, a "system change event" is a computationally detectable transition or modification within an operational system context. In an embodiment, the system change event 118 may affect user interaction, resource allocation, or process execution. For example, system change event 118 may include, but is not limited to, the deployment of a software update, modification of access permissions, activation or deactivation of a system module, a reconfiguration of task routing logic, or a shift in policy parameters governing user workflows. In some embodiments, system change events 118 may be explicitly triggered by administrator actions or programmatic system rules, while in other embodiments, they may be inferred based on data-driven detection of anomalous or state-altering signals. The detection of such events may serve as the entry point for initiating a context-sensitive feedback loop, wherein downstream processing modules are activated to gather, interpret, and structure user responses related to the event.

With further reference to FIG. 1, in some embodiments, system change event 118 may include events such as the rollout of a new task management interface, the reassignment of project ownership, or the integration of an external platform through an updated API. For example, when a centralized administrative decision introduces a new ticketing protocol intended to streamline workflow prioritization, users at the operational level may experience unintended bottlenecks or usability friction. The feedback loop described herein may enable those users, who are often closest to the implementation impact, to submit structured or unstructured responses reflecting their real-time experience. This technical framework facilitates a bottom-up information flow, allowing the system to surface emergent issues, highlight divergences between intent and impact, and provide a computational means for surfacing distributed signals of misalignment. As a result, system-level awareness of on-the-ground conditions can be improved without requiring continuous manual oversight, enabling responsive iteration grounded in user-contextualized data.

In continued reference to FIG. 1, in some embodiments, a system change event 118 may be associated with or derived from transformations in an operational graph or updates to a configuration data structure. For purposes of this disclosure, an "operational graph" refers to a directed or undirected computational structure representing dependencies, interactions, or workflows among system components, tasks, or resources. A configuration data structure may include hierarchically organized settings, schemas, or rule sets that define system parameters, access rules, service endpoints, or behavior profiles. In this context, a system change event 118 may correspond to a detected delta in the graph topology, such as the addition or removal of a node or edge, or a change in node weighting, or a revision to the configuration schema, such as altering timeout values, access roles, or execution paths. Monitoring such structures may allow at least a processor 108 to detect not only direct administrator actions but also emergent systemic changes resulting from automated orchestration, dependency propagation, or cross-module updates. This structural association may enable more precise detection of the change origin and its potential cascade effects on downstream systems and users.

With continued reference to FIG. 1, in an embodiment, detecting the system change event 118 may include monitoring a system data source 152. For purposes of this disclosure, a "system data source" is a source from which the system can observe, poll, or receive signals indicative of operational changes. This may include, without limitation, any data stream, file, memory location, interface, or logging mechanism. In some embodiments, the system data source 152 may include application logs, system configuration registries, user access control tables, change management tickets, or audit trails tracking administrative actions. In other embodiments, the system data source 152 may include telemetry data from connected user devices, API event logs from integrated services, database triggers, or infrastructure orchestration tools that emit state-change notifications (e.g., Kubernetes events or CI/CD deployment logs). By continuously or periodically monitoring one or more system data sources 152, system 100 can detect low-level signals or metadata updates that precede or coincide with meaningful structural or functional shifts in the system environment, enabling proactive detection of potential system change events 118.

In further reference to FIG. 1, in some embodiments, monitoring the system data source 152 may include configuring at least a processor 108 to implement a polling mechanism, subscription routine, or event-listener protocol that actively or passively observes data changes. For example, at least a processor 108 may execute a scheduled polling routine to query an application log at predefined intervals, parsing for delta entries or signature tokens associated with configuration changes. Alternatively, in event-driven architectures, at least a processor 108 may register a callback or webhook to receive real-time notifications when specific variables or objects are updated, such as the reassignment of user roles, introduction of new access controls, or the deployment of new software builds. In this way, system 100 may capture a wide range of operational and behavioral indicators tied to distributed change events.

With further reference to FIG. 1, in an embodiment, to improve accuracy and responsiveness, at least a processor 108 may be further configured to apply data normalization or preprocessing routines to the monitored outputs of the system data source 152. For instance, raw log entries may be transformed into structured events using regular expressions, key-value extraction, or JSON parsing techniques. Noise reduction strategies such as debouncing, thresholding, or anomaly detection may also be applied to minimize false positives and to filter out routine or low-impact system fluctuations. In some embodiments, at least a processor 108 may assign confidence scores or time-stamps to monitored data entries, allowing downstream components, such as a configuration model 156 or change detection engine, to make more informed determinations about whether a candidate signal should trigger further analysis or escalation.

Still referring to FIG. 1, in an embodiment, detecting the system change event 118 may include identifying a candidate change signal 154 from the system data source 152. For purposes of this disclosure, a "candidate change signal" is a discrete or continuous indicator extracted from monitored system data that preliminarily reflects an operational shift within a monitored computing environment. In various embodiments, the candidate change signal 154 may take the form of a modified variable, log entry, database field value, user access control adjustment, service re-deployment, or communication pattern shift, each of which may indicate a broader system-level change worthy of further analysis. In some implementations, identifying the candidate change signal 154 may include applying detection logic to at least one monitored data value from the system data source 152. Such detection logic may include predefined rule sets (e.g., if-then conditions), statistical thresholds (e.g., z-score deviation), pattern recognition algorithms (e.g., signature-based filtering), or machine-learning classifiers trained to recognize the onset of significant configuration or operational changes based on historical examples. In an embodiment, at least a processor 108 may be configured to tag, queue, or score each detected candidate signal for subsequent evaluation using a configuration model 156.

With continued reference to FIG. 1, in some embodiments, identifying a candidate change signal 154 from the system data source 152 may further include applying multi-signal correlation, wherein multiple monitored data values are considered jointly to detect emergent patterns or concurrent shifts that may not be evident from a single source. For example, a spike in helpdesk ticket volume related to access permissions may be correlated with a recent update to a user role policy file or an LDAP configuration change. By evaluating co-occurring changes across heterogeneous data sources, such as a configuration update log and a user activity dashboard, at least a processor 108 may more confidently distinguish significant change events from noise. This correlation may be performed using statistical thresholds, rule-based logic, or probabilistic graphical models that assess dependencies between signals.

Still referring to FIG. 1, in some embodiments, the detection logic may further include temporal constraints to improve specificity and reduce false positives. For instance, at least a processor 108 may be configured to detect change signals that exhibit abrupt variation within a defined time window (e.g., an update spike over a five-minute interval) or to disregard long-term drifts that fall outside operationally meaningful timeframes. Time-series analysis techniques such as moving average filters, exponentially weighted smoothing, or changepoint detection may be applied to determine whether a monitored signal exhibits time-localized behaviors indicative of a system change event 118. In some cases, temporal clustering or window-based aggregation may be used to merge closely spaced change indicators into a single candidate change signal 154.

In continued reference to FIG. 1, in some embodiments, the detection logic may be dynamically updated or refined using machine-learning models trained on historical change event data. At least a processor 108 may be configured to learn patterns from labeled training data, where past system change events 118 are associated with the monitored signal values that preceded them. Supervised or semi-supervised learning models may be used to assign weights to specific features or thresholds based on their predictive accuracy. Alternatively, the detection logic may be tuned in real-time using reinforcement learning, wherein system 100 receives feedback based on the accuracy or relevance of a generated system change event 118 and adjusts detection parameters accordingly. This may allow for ongoing improvement in sensitivity and precision over time, particularly in environments where the definition of a meaningful change may evolve.

With further reference to FIG. 1, in some embodiments, identifying the candidate change signal 154 may include applying one or more fallback strategies in situations where the system data source 152 is unavailable, partially incomplete, or yields ambiguous results. For example, if the primary system log is inaccessible or lacks sufficient granularity, at least a processor 108 may fall back to alternative sources such as change control tickets, version control commit logs, or runtime audit trails. Fallback mechanisms may also include default detection heuristics or baseline deviation metrics applied to a reduced set of inputs. This may ensure continuity of monitoring and allows for resilient operation in degraded data environments or during unexpected system failures. In an embodiment, the detection logic may incorporate anomaly detection techniques to flag candidate change signals 154 based on deviations from learned or expected behavior. At least a processor 108 may execute unsupervised learning methods such as clustering, isolation forests, or autoencoders to establish a model of normal operation, then flag outlier behaviors as candidate change signals 154. Alternatively, statistical approaches such as Z-score thresholds, cumulative sum (CUSUM) control charts, or seasonal hybrid extreme studentized deviate (S-H-ESD) tests may be applied to continuous signals. These methods may enable identification of subtle, non-obvious system shifts that may precede user-observable misalignments or performance regressions. Further, in some embodiments, system 100 may include configurable rule-based override logic to augment or supersede the detection logic. For instance, an administrator may define hard-coded triggers based on critical system parameters (e.g., "generate a change signal if the access control policy is edited after hours"), ensuring known high-priority events are always captured. These rules may be implemented using an interpreter or declarative logic engine capable of parsing policy expressions, temporal constraints, and user role metadata. This layer of override logic may ensure organizational priorities or compliance requirements are enforced irrespective of learned model behavior.

In further reference to FIG. 1, in an embodiment, detecting the system change event 118 may include analyzing the candidate change signal 154 using a configuration model 156. For purposes of this disclosure, a "configuration model" is a model that encodes the expected behavior, relationships, or operational thresholds of system parameters under typical or predefined configurations. The configuration model 156 may include mappings between system states, dependency constraints among services, and expected signal patterns under stable operational conditions. In some embodiments, the configuration model 156 may be implemented as a pre-trained model with static configuration profiles, while in other embodiments, the configuration model 156 may be dynamically updated using historical data logs and user interaction telemetry. In an embodiment, when a candidate change signal 154 is identified, such as a sudden spike in response time, a re-routing of workflow paths, or a deviation from policy-based access control patterns, the configuration model 156 may be used to determine whether the signal represents a benign fluctuation or a meaningful deviation from an expected system state. This analysis may include evaluating whether the candidate signal violates one or more configuration constraints, falls outside of statistically derived confidence intervals, or correlates with known change patterns stored in the model's memory. By comparing the candidate signal against the configuration model 156, at least a processor 108 can computationally infer whether the signal is indicative of a substantive change requiring downstream feedback engagement. In some embodiments, the configuration model 156 may also assign a confidence score or severity tier to the candidate signal, enabling downstream modules to adjust the urgency or type of query issued in response.

In continued reference to FIG. 1, in various embodiments, the configuration model 156 may be implemented using different model architectures depending on the complexity of the system context. For example, the configuration model 156 may include an anomaly detection engine based on unsupervised clustering to identify deviations from normative behavior profiles, a supervised classifier (e.g., a random forest or neural network) trained on labeled historical configuration transitions, or a rule-based inference engine that encodes explicit logical conditions reflecting known system constraints. In some embodiments, the configuration model 156 may also employ ensemble techniques that combine multiple model types to improve robustness and interpretability. In systems employing machine-learning-based models, the configuration model 156 may undergo periodic retraining or fine-tuning using updated telemetry, user behavior traces, or system log data in order to adapt to evolving operational conditions. In such cases, model drift detection techniques may be incorporated to monitor performance degradation or concept shift, triggering automatic retraining routines or administrator review. This may allow the configuration model 156 to remain accurate over time and maintain sensitivity to meaningful change signals, while reducing false positives or missed events due to environmental variability or system evolution.

In further reference to FIG. 1, in embodiments where the configuration model 156 includes one or more trainable components, such as machine-learned classifiers, autoencoders, or anomaly detection models, initial training may be performed using historical system state data and associated change event labels. This training dataset may include time-series logs, user interaction traces, resource utilization metrics, or configuration snapshots, each annotated to indicate known system change events 118 or periods of operational stability. For example, past administrative actions, software deployment records, and user workflow transitions may serve as labeled ground truth examples for supervised learning models. In unsupervised contexts, clustering techniques may be applied to unlabeled sequences to define baseline operating states, against which deviations are flagged as candidate change signals 154. Over time, the configuration model 156 may be retrained or updated using newly collected operational data. In some embodiments, a rolling window of system telemetry may be maintained in a version-controlled data store, enabling periodic re-analysis of model performance and drift. Retraining may be initiated automatically based on a degradation in detection accuracy (e.g., through a drop in precision or recall metrics) or manually triggered by a system administrator. In other embodiments, reinforcement learning may be employed to optimize detection thresholds or weighting parameters, using feedback from downstream modules (e.g., user responses or resolution outcomes) as a performance signal. Model versioning and audit logging may be incorporated to ensure traceability and rollback capability, particularly in regulated or high-stakes environments.

As the configuration model 156 evolves through training and retraining, its improved accuracy in detecting system change events 118 may enable more precise and timely initiation of the adaptive feedback loop. For instance, earlier or more contextually relevant detection of change events can result in prompt issuance of targeted queries, reducing latency in surfacing critical user feedback. In embodiments where the configuration model 156 incorporates classification of change type or predicted impact zone, this classification may be used to dynamically tailor the content, tone, or timing of follow-up queries issued by the query engine 120. Furthermore, refinement of the configuration model 156 may contribute indirectly to the quality of the structured feedback dataset, by ensuring that only meaningful and contextually significant events trigger the downstream processes. Over time, system 100 may learn to associate specific patterns of user response, such as sentiment trajectories, frequently recurring issues, or role-specific friction points, with particular classes of configuration changes. This association may be encoded into reinforcement signals used to update not only the configuration model 156, but also the salience-ranking engine 176 responsible for prioritizing response clusters. In this way, improved system change detection may feed into a virtuous cycle of alignment improvement, where both the signal that triggers feedback and the logic that interprets it co-adapt over time to better reflect the lived experience of distributed users within the operational graph.

With continued reference to FIG. 1, in an embodiment, detecting the system change event 118 may include generating the system change event 118 as a function of comparing the candidate change signal 154 to a change detection threshold 158. For purposes of this disclosure, a "change detection threshold" refers to one or more predefined or dynamically computed criteria that determine whether a given candidate change signal 154 reflects a meaningful system-level modification. In some embodiments, the change detection threshold 158 may be a scalar value applied to a numerical indicator (e.g., a delta in configuration weight, a spike in access logs, or a deviation in latency metrics), while in other embodiments, it may represent a multi-dimensional decision boundary evaluated using a rule-based or machine-learning classifier. The candidate change signal 154 may be compared against the change detection threshold 158 using computational logic, which may reside within the configuration model 156 or be implemented as a separate threshold evaluation module. For example, a candidate signal indicating a 5% increase in task reassignment frequency over a baseline may not, on its own, exceed a static threshold. However, when evaluated in conjunction with contextual factors, such as the recency of an interface update or a cluster of associated access errors, it may surpass an adaptive threshold that accounts for compound effects. In such embodiments, system 100 may utilize weighted scoring algorithms or ensemble logic to determine whether the aggregated signal contextually satisfies the threshold condition. Once the threshold is exceeded, a system change event 118 may be instantiated as a discrete object or flag within the system memory, triggering downstream processes such as query generation, feedback solicitation, or logging for auditability. This thresholding mechanism may help to filter out noise and ensure that only significant changes trigger the adaptive feedback loop.

In continued reference to FIG. 1, in some embodiments, the change detection threshold 158 may itself be dynamically adjusted over time based on historical system behavior, user engagement patterns, or feedback loop outcomes. For example, system 100 may store metadata associated with past candidate change signals 154, including whether those signals triggered meaningful downstream effects (e.g., a high volume of negative feedback, significant workflow disruption, or resolution-level escalations). A threshold adjustment module may analyze this metadata using statistical methods or machine-learning models to infer optimal threshold levels for future comparisons. This process may involve techniques such as moving averages, time-series trend analysis, or reinforcement learning frameworks that update threshold parameters in response to reward signals tied to detection accuracy or intervention impact. In an embodiment, system 100 may maintain a dynamic threshold table indexed by signal type, system domain, or user role, allowing the change detection process to flexibly adapt to heterogeneous operating contexts. For instance, a minor change in user interface layout may warrant a lower threshold in high-sensitivity environments (e.g., medical documentation systems), whereas a similar change in an internal reporting dashboard may require a higher threshold. By enabling threshold values to evolve over time, system 100 may enhance both its responsiveness to subtle but important changes and its ability to suppress false positives that might otherwise burden users with unnecessary feedback prompts. This dynamic adaptability may contribute to the technical robustness and scalability of the feedback loop architecture.

Still referring to FIG. 1, in an alternative embodiment, detecting the system change event 118 may originate from a user-initiated input rather than through data-driven signal detection. For purposes of this disclosure, a "user-initiated system change event" is an explicitly provided instruction indicating that a configuration change has occurred or is anticipated. In such cases, the user input may include structured metadata that defines one or more parameters for a downstream query, such as the timing of prompt issuance, intended recipients or user segments, query language or tone, associated change category, or expected impact domain. For instance, an administrator deploying a new document management policy may directly initiate a system change event 118 and provide configuration directives that specify the query should be delayed by 48 hours, be sent only to users with document upload privileges, and contain language referencing the updated retention rules. In some embodiments, this administrator-level configuration data may be initially passed to the query engine 120 as a parameter set, which may serve as the default context for generating the prompt. However, the query engine 120 may optionally modify these parameters downstream based on dynamic conditions, such as evolving user feedback, system metadata, or real-time workload data. For example, if system 100 detects a spike in help desk tickets related to the newly deployed policy, the query engine 120 may adapt the prompt tone to include clarifying examples or accelerate the scheduled prompt issuance. This configuration-overridable model may allow for both top-down control and bottom-up responsiveness, ensuring that administrator intent can guide feedback collection while still permitting system-level adaptation for relevance and clarity.

With further reference to FIG. 1, in an embodiment, at least a processor 108 may be configured to generate, using a query engine 120, a context-sensitive query 122 to be issued to at least one user node 124 as a function of detecting the system change event 118. For purposes of this disclosure, a "context-sensitive query" is a digital prompt that is generated or adapted based on one or more parameters related to the detected system change event 118. In an embodiment, the context-sensitive query 122 may be structured or semi-structured. Parameters may include the type of change (e.g., interface update, policy shift, module deactivation), the operational scope (e.g., limited to a particular team or system-wide), temporal factors (e.g., recency or frequency of changes), and user-specific context (e.g., past interactions, role sensitivity, or workflow dependencies). For purposes of this disclosure, a "user node" is a computing device associated with an identifiable end-user that is communicatively connected to the system and capable of receiving and responding to queries. A user node may include, but is not limited to, a desktop workstation, laptop computer, tablet, mobile phone, smart wearable device, or any authenticated interface through which the user interacts with system 100. In some embodiments, the user node may be provisioned with application-level access to respond to queries natively; in other embodiments, the query may be delivered through embedded web modules, messaging integrations, or secure email clients.

With continued reference to FIG. 1, in an embodiment, system 100 may issue context-sensitive queries to one or more user nodes identified as being affected by the system change event 118. Targeting may be determined based on role mappings, access privileges, recent activity logs, or historical feedback patterns. For example, a change in task routing logic may trigger a query to operations managers and front-line agents, each receiving a role-specific version of the query tailored to their scope of responsibility. The query itself may include open-ended prompts (e.g., "How has this change impacted your ability to complete assigned tasks?"), categorical choices, Likert-scale ratings, or embedded checklists, depending on the nature and expected complexity of the feedback.

Still referring to FIG. 1, the query engine 120 may include one or more submodules that determine query phrasing, structure, target selection, and delivery parameters. In some embodiments, the query engine 120 may apply a rules-based framework (e.g., predefined mappings between change types and question templates). In other embodiments, the query engine 120 may incorporate statistical models or machine-learning algorithms trained on prior change-response data to predict the most effective query format and timing. The query engine 120 may also leverage sentiment history, feedback density in prior clusters, or salience weighting derived from prior user inputs to refine the selection or personalization of queries. In some embodiments, the query engine 120 maintains a versioned query-response log that informs ongoing model refinement or prompt calibration.

With further reference to FIG. 1, in some embodiments, generating the context-sensitive query 122 may include dynamically adapting the phrasing of the query based on contextual features associated with the system change event 118 and the user node. For example, the phrasing may be modified according to the user's role, communication preferences, or historical response patterns. A user node associated with a technical operations lead may receive a query framed in terms of system efficiency or resource bottlenecks, whereas a user node associated with an end user may receive a version focused on task usability or experience friction. Adaptive phrasing may be accomplished using a language generation model, a set of predefined linguistic templates mapped to role-context matrices, or a hybrid framework that selects and modifies templates using parameter tuning based on current system conditions.

In continued reference to FIG. 1, in some embodiments, the query engine 120 may further be configured to perform multi-channel query routing, wherein the context-sensitive query 122 is delivered through one or more communication modalities selected as a function of the user node's capabilities and user communication preferences. Example delivery channels may include integrated system dashboards, mobile push notifications, email clients, workplace messaging platforms (e.g., Slack, Microsoft Teams), or in-app widgets embedded within the user's workflow environment. The routing mechanism may utilize a delivery preference profile associated with each user node or apply a probabilistic model trained to predict the most effective channel for eliciting timely and complete responses.

In further reference to FIG. 1, in an embodiment, generating the context-sensitive query 122 to be issued to at least one user node 124 may include delaying issuance of the context-sensitive query 122 for a dynamic time interval 160, wherein the dynamic time interval 160 is determined as a function of applying a context modulation layer 162 to the system change event 118. As used herein, a "dynamic time interval" is a duration determined based on contextual characteristics of the detected system change event 118. This delay interval may not be hardcoded but instead may vary in response to features extracted from the event itself and surrounding operational conditions. The purpose of this delay may be to enable system 100 to capture user feedback at a time when experiential impact has materialized but cognitive recall and user engagement remain high. In an embodiment, the dynamic time interval 160 may be computed by applying a context modulation layer 162 to the system change event 118. For purposes of this disclosure, a "context modulation layer" is a processing component that evaluates event-specific metadata to derive an optimal query issuance window. Inputs to the context modulation layer 162 may include: (i) the type or severity of the system change (e.g., software patch vs. policy overhaul), (ii) the expected temporal latency of user-perceivable impact, (iii) historical engagement patterns associated with similar prior events, (iv) organizational roles affected, and (v) operational load or concurrent events. In some embodiments, the context modulation layer 162 may be tuned to avoid query fatigue by extending the delay when overlapping events are detected or may shorten the interval when the event corresponds to a high-risk misalignment vector. Additionally, the modulation layer may incorporate temporal decay functions to avoid issuing a query once the utility of feedback is projected to fall below a defined informativeness threshold. The dynamic timing mechanism thus may ensure that context-sensitive queries are not only personalized in content but also optimally timed for relevance, salience, and impact.

In further reference to FIG. 1, in some embodiments, different classes of system change events 118 may be associated with distinct dynamic time interval profiles. For instance, deployment of a minor interface redesign may trigger a short delay interval, such as 30 minutes to 2 hours, allowing users to interact with the new layout and identify early usability concerns. In contrast, more complex changes like restructured team hierarchies or the integration of a new third-party tool may warrant longer intervals, ranging from several hours to multiple days, so that deeper workflow implications can surface before feedback is solicited. Events involving sensitive access permission changes may involve delay profiles tuned not only by elapsed time but by monitoring system behavior for evidence of friction or access failures.

With further reference to FIG. 1, in some embodiments, the context modulation layer 162 may reference a historical mapping of event categories to empirically determined optimal feedback windows, refining these mappings over time based on observed response rates, sentiment volatility, or issue emergence trends. For example, prior event-response data may indicate that feedback collected too soon after certain infrastructure-level updates tends to be sparse or non-actionable, while feedback collected 6-12 hours later captures higher-quality insights. Accordingly, the dynamic delay may be retrained using supervised or reinforcement learning techniques, allowing the system to evolve its timing strategies based on operational experience. This adaptive timing strategy may also lay the groundwork for re-query logic, wherein system 100 may selectively issue follow-up queries based on detected ambiguity, low-confidence salience scores, or changing sentiment trajectories following the initial response cycle. Embodiments relating to re-query generation and scheduling are described in further detail below.

With further reference to FIG. 1, in an embodiment, determining dynamic time interval 160 may include extracting event-specific metadata from the system change event 118. For purposes of this disclosure, "event-specific metadata" refers to data attributes that describe the nature, scope, context, or system-level impact of a detected system change event. This may include, but is not limited to: the type of change (e.g., software update, policy shift, infrastructure modification), the identity or roles of affected user nodes, the timestamp or time duration of the event, the initiating subsystem, severity level, expected user-facing impact, and any associated system logs, alerts, or user activity deviations observed in proximity to the event. In some embodiments, event-specific metadata may be selected by a metadata extraction module that monitors and intercepts event logs, configuration management systems, or change detection pipelines within system 100. Selection of metadata elements may be rule-based, model-driven, or context-aware. For example, for a user interface change event, the selected metadata may emphasize usability signals (e.g., click patterns or navigation friction), whereas for a backend access permission update, the metadata may emphasize authentication logs and permission deltas. In some embodiments, metadata selection may involve a prioritization routine that scores available data fields based on relevance to downstream classification or delay estimation tasks. Selected metadata fields may be normalized into a consistent format (e.g., vectorized representation or key-value map) and passed to a context modulation layer 162 for event category classification and delay determination, as described below.

In further reference to FIG. 1, in further embodiments, selection of event-specific metadata from the system change event 118 may involve a multi-stage filtering and prioritization pipeline. In one embodiment, system 100 may implement a rule-based metadata selector, wherein predefined heuristics or configuration templates specify which metadata fields to extract for given categories of system changes. For instance, a table of event types may be associated with a ranked list of relevant metadata fields (e.g., for a "deployment event," the selector might prioritize "component affected," "deployment region," and "release severity"). These rules may be updated over time by system administrators or tuned dynamically based on feedback accuracy or classifier performance. In another embodiment, the metadata selection process may use a feature-weighting model trained on prior classification outcomes. Here, system 100 may analyze past events and identify which metadata fields were most predictive in determining the correct event category or timing outcome. A weight vector or attention mechanism may then be applied to incoming metadata fields, selecting only those that exceed a relevance threshold or that fall within a learned high-informative feature set. The model may operate using supervised learning with labeled event examples, or through reinforcement learning that rewards improved downstream classification accuracy or feedback quality. In yet another embodiment, metadata selection may be context-aware, dynamically adjusting the selected metadata fields based on surrounding system state or user activity patterns. For example, if system 100 detects concurrent high-volume events or abnormal user engagement in specific departments, the metadata selector may include additional contextual fields such as "concurrent event count," "user activity deviation metrics," or "recent complaint volume." This adaptive selection may ensure that the context modulation layer receives enriched, situationally relevant inputs, thereby improving classification and timing accuracy.

With continued reference to FIG. 1, in some implementations, the metadata selection process may also include a data sanitation and normalization subroutine, which may validate field integrity, resolve inconsistencies, and convert disparate formats into a consistent intermediate representation. This may include timestamp normalization, tokenization of free text fields (e.g., change descriptions), or transformation of categorical labels into embeddings suitable for downstream machine learning models. The resulting selected and preprocessed metadata may then be compiled into a feature vector or structured metadata object and passed to the context modulation layer 162 for classification into an event category and subsequent computation of a dynamic time interval.

In continued reference to FIG. 1, in an embodiment, determining dynamic time interval 160 may include classifying the event-specific metadata to an event category, wherein the event category comprises an optimal feedback window. In an embodiment, and without limitation, event categories may include labels such as "minor interface update," "infrastructure overhaul," "policy modification," "access control reconfiguration," or "critical incident response," each associated with its own empirically derived or inferred optimal timing profile for issuing a context-sensitive query 122. In some embodiments, the classification process may be carried out by a classification model trained on historical data that maps event-specific metadata patterns to known event categories. The classification model may be implemented using a machine-learning algorithm such as a decision tree, random forest, support vector machine, gradient boosting model, or a neural network, depending on system complexity and performance requirements. During runtime, the selected event-specific metadata may first be encoded into a feature vector that represents the metadata fields in a normalized numerical or categorical format suitable for input into the model.

In further reference to FIG. 1, in an embodiment, the classification model may have been trained using supervised learning techniques, wherein past system change events were labeled with their corresponding event categories based on observed system behavior and user response dynamics. In such embodiments, the model may learn to associate specific metadata patterns, such as "scope: narrow," "change type: UI," "affected users: <10," "prior issue rate: low," with a target category like "minor interface update." The model may also incorporate contextual signals such as user role distribution, organizational tier, or time-of-day, which can influence the classification output. In other embodiments, the classification model may utilize a historical mapping structure, which may be derived from an event-response dataset accumulated over time. This mapping may associate previously observed feature vector profiles with outcome metrics such as response rate, feedback quality, or issue emergence trends, enabling system 100 to infer not only the appropriate event category but also the projected utility of feedback collected at various delay intervals. The classification logic may reference this mapping either directly (e.g., using nearest-neighbor comparison) or indirectly (e.g., through training model weights on this data).

With continued reference to FIG. 1, in an embodiment, once classified, the event category may be used to retrieve or compute an optimal feedback window, which may be expressed as a delay range (e.g., 30 minutes to 2 hours for minor changes, 12 to 48 hours for systemic updates). In an embodiment, system 100 may then proceed to compute dynamic time interval 160 as a function of this category-specific feedback window, optionally adjusting based on additional modulation criteria as described further below. In some implementations, the classification process may include a confidence score associated with the predicted event category. This score may be used to trigger fallback behavior (e.g., default timing) or initiate human review when classification confidence falls below a defined threshold. Additionally, the classification engine may support periodic retraining or online learning, allowing it to refine its accuracy as the system accumulates new event-response pairs and organizational behavior shifts over time.

Still referring to FIG. 1, in an embodiment, determining dynamic time interval 160 may include outputting the dynamic time interval as a function of the event category. For purposes of this disclosure, an "event category" is a discrete label or classification assigned to a system change event. The category event, in some cases, may reflect the scope, impact, and temporal characteristics of the change. Once classified, the event category may serve as an index into a category-delay mapping structure that associates each event category with a predefined or dynamically generated optimal feedback window. In some embodiments, the category-delay mapping may be implemented as a static lookup table encoded in memory 112, wherein each event category maps to a specific delay duration or range (e.g., 2 hours, 6-12 hours, 24-48 hours). In other embodiments, the mapping may be realized as a set of parametric models or interpolation functions that compute the dynamic time interval 160 based on additional metadata such as event severity, user density, prior feedback quality metrics, or organizational context. For instance, if an event is classified as a "critical access control update," the mapping logic may determine that immediate or near-immediate feedback (e.g., <1 hour) is required to capture high-priority misalignment or friction. Conversely, a "team restructuring announcement" may map to a broader delay window (e.g., 24-72 hours), recognizing the need for downstream impact to unfold before responses are solicited. These mappings may incorporate risk heuristics, such as the likelihood of negative outcome amplification if early feedback is not obtained, or decay functions modeling the drop-off in recall quality over time.

In further reference to FIG. 1, in some embodiments, the dynamic time interval 160 may be adjusted within the mapped window using a priority coefficient derived from real-time telemetry or organizational state (e.g., current feedback load, system latency, event concurrency). For example, a delay window of 4-6 hours may be shortened to 3 hours in response to elevated user activity levels or recent instability flags. Conversely, the interval may be extended to avoid overlapping queries from adjacent events, preventing survey fatigue. Additionally, system 100 may include a feedback optimization module configured to fine-tune the delay interval based on response performance data collected over time. This adaptive logic may apply supervised learning or reinforcement learning techniques to continuously retrain the category-delay mapping based on observed correlations between issuance timing and feedback quality indicators, such as response depth, participation rate, sentiment clarity, or actionable insight density. In an embodiment, upon computing the final dynamic time interval 160, at least a processor 108 may trigger a scheduling module to initiate a countdown or register a future task to issue the context-sensitive query 122 at the appropriate point in time. This may enable temporal decoupling between the system change event 118 and the user-facing query, enhancing the contextual relevance and salience of the feedback request.

In continued reference to FIG. 1, in an embodiment, at least a processor 108 may be further configured to determine whether the initial input responses 126 associated with a given system change event 118 yield insufficient salience density, conflicting feedback signals, or incomplete coverage of affected user subgroups. In such cases, a re-query module may generate a follow-up context-sensitive query 122, optionally refined using insights derived from previously aggregated feedback. For example, if early responses to a change event affecting a project dashboard suggest confusion about a specific feature (e.g., a date filter), the re-query may be tailored to explicitly probe users about that feature. In some embodiments, re-engagement criteria may include thresholds related to participation rate, sentiment ambiguity, or topic divergence. Optionally, the re-query may include modified language, narrowed recipient scope, or reference to prior anonymized feedback summaries to encourage higher-quality responses.

With continued reference to FIG. 1, in some embodiments, the query engine 120 may further be configured to initiate a salience-triggered re-query process. For purposes of this disclosure, a "salience-triggered re-query" is a follow-up query issued to a user node or alternate node in response to detection of a non-response, partial response, or insufficiently informative feedback associated with a previously issued context-sensitive query 122. The decision to re-query may be governed by a salience evaluation function applied to the expected vs. received feedback coverage, urgency of the associated system change event 118, or the strategic role of the user node. In an embodiment, re-query timing, phrasing, and delivery channel may be modulated based on the historical responsiveness of the user node and the feedback gap identified. In some cases, system 100 may escalate the re-query to a supervisor-level user node or surface the unresolved issue within a feedback management interface for manual triage.

With further reference to FIG. 1, in an embodiment, system 100 may compute a feedback salience value 170 for each context-sensitive query 122, which serves as a metric of expected informational importance based on the nature of the system change event 118, historical impact data, and role-specific sensitivity profiles. For example, queries associated with access control changes or cross-team workflow reassignments may be assigned higher salience values 170 due to their anticipated operational ripple effects. In an embodiment, system 100 may compare the feedback salience value 170 to a response completeness score derived from the actual content or metadata of received user input. If the completeness score falls below a predefined coverage threshold, the query engine 120 may trigger a re-query event, optionally escalating it to a higher-priority user node or supervisory entity. In some embodiments, the re-query process may batch multiple unfulfilled high-salience feedback instances into a team-level or department-level aggregation, prompting a consolidated re-engagement through a structured survey or directed inquiry.

In further reference to FIG. 1, in some embodiments, the re-query logic may incorporate a reinforcement learning (RL) framework to dynamically optimize when and how follow-up queries are issued. The RL model may be trained using historical data that includes: (i) characteristics of the original query (e.g., topic, salience value 170, user role); (ii) the presence or absence of timely responses; (iii) downstream utility of obtained feedback (e.g., whether it led to an update, escalation, or resolution); and (iv) user-level interaction patterns. Based on observed outcomes, the RL agent may adjust parameters such as the timing of re-query issuance, the phrasing of the follow-up, the targeting of alternate user nodes, or the escalation route. Over time, system 100 may learn to allocate re-query efforts more efficiently, prioritizing high-impact gaps while reducing unnecessary or low-value follow-ups. In some implementations, reward signals for the RL agent may be computed using metrics like improved response coverage, decreased issue resolution time, or increased downstream alignment.

In continued reference to FIG. 1, in an embodiment, at least a processor 108 may be configured to receive, from the at least one user node 124, an input response 126 as a function of the context-sensitive query 122. For purposes of this disclosure, an “input response” refers to user-generated data submitted in response to the system-issued context-sensitive query. The input response 126 may be in the form of free-text, structured form data, selected response options, audio transcriptions, or other user-generated content that conveys experiential insight or evaluative feedback. The input response 126 may further include metadata such as a timestamp, device identifier, user role classification, query version identifier, and sentiment polarity scores (either raw or pre-processed). In an embodiment, the input response 126 may be received over a secure communication protocol such as HTTPS, WebSocket, or an authenticated API call, and may be routed through one or more intermediate systems for pre-processing, validation, or de-identification. The receiving step may include buffering or queuing of responses, particularly in distributed environments with asynchronous response latency. In some cases, at least a processor 108 may validate the input response 126 format or confirm query-response correspondence using a query ID token embedded in both the outgoing query and the incoming response.

Still referring to FIG. 1, in embodiments where the query includes multiple parts or sub-prompts (e.g., a free-response field and a Likert scale selection), the input response 126 may contain multiple segments, which may be disaggregated or recombined by at least a processor 108 depending on downstream processing needs. In some embodiments, the user node may transmit additional context voluntarily, such as attachments, screenshots, or links to related system artifacts, which may be stored alongside the input response 126 and used in later steps of natural language or metadata analysis. In an embodiment, at least a processor 108 may timestamp the receipt of the input response 126 and associate it with the originating system change event 118, forming the initial data payload for subsequent feedback structuring operations.

In continued reference to FIG. 1, in an embodiment, system 100 may include one or more language processing modules. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term “token,” as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into “n-grams”, where all sequences of n consecutive characters are considered. Any or all possible sequences of tokens or words may be stored as “chains”, for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With further reference to FIG. 1, in an embodiment, at least a processor 108 may be configured to process the input response 126 using a natural language processing (NLP) model 128. For purposes of this disclosure, an "NLP model" is a computational framework including one or more algorithms, layers, or modules that transform natural language input into a structured, machine-interpretable representation. The NLP model 128 may be instantiated using a transformer-based architecture, a recurrent neural network (RNN), a convolutional neural network (CNN), or any suitable model architecture capable of handling sequential language data. Processing the input response 126 using the NLP model 128 may facilitate syntactic parsing, semantic interpretation, and contextual embedding of the user-provided textual and structured input. The NLP model 128 may operate under real-time or near-real-time inference conditions and may be tuned to prioritize domain-relevant language patterns, abbreviations, or sentiment cues indicative of downstream implementation effects. This processing stage enables system 100 to reduce linguistic variability and extract meaning-bearing features from distributed user feedback.

In further reference to FIG. 1, in an embodiment, processing the input response 126 using the NLP model 128 may include normalizing the input response 126 and segmenting a textual input 130 of the input response 126 into a sequence of units 132. For purposes of this disclosure, "normalizing" refers to a set of preprocessing operations applied to raw textual input 130 to reduce variation and standardize formatting prior to linguistic analysis. Such normalization may include, for example, converting all characters to lowercase, removing punctuation or special characters, correcting common spelling errors, expanding contractions, or stripping excess whitespace. This may help ensure consistent downstream interpretation by the NLP model 128. The term "segmenting," for purposes of this disclosure, refers to the computational decomposition of normalized text into discrete linguistic units, such as tokens, phrases, or sentence components, depending on the granularity of the model. For example, the phrase "The system isn't working as expected." might be segmented into the units "the," "system," "is," "not," "working," "as," "expected" after contraction expansion and tokenization. In some embodiments, the segmentation step may use rule-based algorithms, statistical models, or pretrained language tokenizers to determine syntactic boundaries and semantic boundaries. The resulting sequence of units 132 is then used as input to further embedding and modeling stages.

With continued reference to FIG. 1, in an embodiment, processing the input response 126 using the NLP model 128 may include converting the sequence of units 132 into a sequence of embeddings 134 using an embedding layer 136. For purposes of this disclosure, a "sequence of units" refers to an ordered set of discrete textual components extracted from an input response 126. These units may include characters, subword fragments, complete words, or tokens generated by tokenization schemes such as whitespace segmentation, Byte-Pair Encoding (BPE), or WordPiece. For example, the phrase "Configuration updated successfully" may be tokenized into units such as ["Configuration", "updated", "successfully"] or into subword units like ["Config", "6uration", "updated", "successful", "6ly"] depending on the tokenization strategy. A "sequence of embeddings," for purposes of this disclosure, is a corresponding sequence of fixed-size vector representations generated from the sequence of units 132. In an embodiment, each embedding may include a numerical vector (e.g., 300 or 768 dimensions) capturing the semantic and syntactic characteristics of the associated unit. The conversion may be performed by an embedding layer 136, which may include a learned embedding matrix, a pre-trained embedding model (e.g., GloVe, FastText), or a dynamically fine-tuned transformer-based embedding structure. For purposes of this disclosure, an "embedding layer" is a component of a model that performs transformations from discrete linguistic units to continuous vector representations. The embedding layer 136 may serve to translate discrete linguistic symbols into a form suitable for neural network processing, allowing for the preservation of contextual relationships and enabling more sophisticated language understanding in downstream model components.

In continued reference to FIG. 1, in an embodiment, processing the input response 126 may include embedding structured data 164 of the input response 126 together with the sequence of units 132 to form the sequence of embeddings 134. For purposes of this disclosure, "structured data" refers to input information that is organized in a predefined schema or format. For example, and as non-limiting examples, structured data 164 may include key-value pairs, tabular fields, dropdown selections, boolean flags, or categorical attributes associated with the user node or the context of the input response 126. Structured data 164 may include, but is not limited to, metadata indicating user role (e.g., "nurse," "IT administrator"), timestamp of submission, confidence score assigned by the interface, task category, or pre-filled responses selected from a menu. In some embodiments, structured data 164 may also encompass system-generated values, such as response latency, device type, or geolocation. To incorporate the structured data 164 into the language model pipeline, system 100 may encode such data as auxiliary embeddings and concatenate or fuse them with the token-level embeddings derived from the unstructured textual input 130. For example, a response reading "the new workflow is slower" submitted by a user with the role of "regional operations lead" may be embedded alongside structured attributes such as {"role": "regional operations lead", "submission_time": "08:45", "workflow_id": "WF-9021"}. These structured features may be transformed into vector representations using one-hot encoding, learned embedding vectors, or type-specific encoders and combined with the token embeddings either by vector concatenation, projection into a shared embedding space, or through learned attention-based fusion mechanisms. This unified embedding approach may ensure that downstream layers of the NLP model 128 are aware of both the semantic content of the textual input 130 and relevant contextual signals derived from structured fields. When processed by the language model, these combined embeddings may enhance the contextual representation 140. Such representations reflect the interaction between textual semantics and structured context, and they may serve as the foundation for subsequent aggregation and clustering operations.

Still referring to FIG. 1, in an embodiment, processing the input response 126 using the NLP model 128 may include passing the sequence of embeddings 134 through at least one layer of a language model 138 to generate a contextual representation 140 of the textual input 130 of the input response 126. For purposes of this disclosure, a "contextual representation" is the intermediate, position-aware, and semantically enriched vector outputs generated by the model for each token or unit within the input sequence. These representations may be computed using a deep neural network that accounts for both the local and global relationships between units, thereby capturing the meaning of a given token or phrase in the context of the surrounding input. In some embodiments, the language model may include a transformer-based architecture configured to apply self-attention mechanisms across the entire sequence of embeddings 134. The self-attention mechanism may enable the model to weigh the relevance of each unit relative to others in the sequence, allowing for dynamic contextualization of terms that may have variable meaning depending on position or phrasing. For example, the token "change" may refer to a software update, a personnel reassignment, or a system outage, its precise interpretation may be determined through relational encoding across the input sequence and informed by both textual and embedded structured features.

With further reference to FIG. 1, in an embodiment, the NLP model 128 and associated salience-ranking engine 176 may be initially trained using a supervised learning protocol on a dataset comprising labeled user feedback entries and associated relevance scores. For example, historical user input responses 126 may be annotated with impact labels (e.g., "urgent," "actionable," "informational") based on domain expert review or retrospective resolution outcomes. In certain embodiments, a reinforcement learning loop may be incorporated, wherein the model is periodically retrained using newly collected structured feedback objects 148 and downstream user actions (e.g., resolution timestamps, manual escalation) to adjust internal weighting parameters. This may allow system 100 to refine its representation of salience and prioritization over time based on real-world deployment. Optionally, online learning frameworks may be used to integrate this retraining into production environments with minimal model drift or downtime.

In continued reference to FIG. 1, in an embodiment, the language model may consist of multiple stacked layers of self-attention and feed-forward networks, where each layer refines the contextual representation 140 of the input sequence. The output of each layer may be passed to the next, with positional encodings optionally injected to preserve order information across tokens. The final layer's output may represent the full contextual embedding of the input response 126, optionally summarized through pooling or classification heads for downstream usage. Optionally, system 100 may implement a lightweight language model for edge-device compatibility or use a frozen pre-trained model with selectively trainable adapters to reduce computational overhead while preserving semantic capacity. In some embodiments, the model may be dynamically reconfigured depending on the input length or complexity of the detected system change event 118, enabling the system to adjust its processing depth in real-time. Additionally, in certain variants, the language model may be augmented with external memory modules, domain-specific encoders, or gating mechanisms that incorporate structured metadata or attention masks derived from the impact context of the query. This may allow the contextual representation 140 to be further informed by operational parameters, user roles, or historic feedback correlations, ensuring that the representation reflects both linguistic nuance and system-specific relevance. The resulting contextual representation 140 may be stored, passed to clustering engines, or fused with additional signals (e.g., salience indicators, sentiment tags, or historical usage patterns) to inform the generation of structured feedback and prioritization logic in subsequent processing stages.

Alternatively or additionally, and with continued reference to FIG. 1, language processing module may be produced using one or more large language models (LLMs). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications, advertising documents, newspaper articles, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if the user response includes a partially typed phrase such as "This new interface is frus-", the LLM may predict that "frustrating" is the most likely continuation based on contextual and learned patterns in prior feedback. In such embodiments, the LLM may rank candidate completions (e.g., "frustrating," "fresh," "frozen") based on their semantic fit and syntactic structure, optionally modulated by a prompt parameter or fine-tuning vector. These ranked predictions may assist in disambiguating incomplete or nonstandard responses, thereby enhancing the fidelity of the contextual representation 140 used in downstream clustering and prioritization operations. In some implementations, the LLM may include an encoder component configured to generate embeddings from user input and a decoder component configured to predict follow-on tokens or generate enriched sequence representations that contribute to the structured feedback dataset.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer 136 and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like In some embodiments, input may include any set of data associated with user feedback in response to a system change event 118, such as a written comment describing workflow friction following a software update, a description of a bug encountered in a new interface, or an expression of approval or disapproval regarding a recently deployed policy. Such input may be collected in real time or after a delay and may be used to populate the contextual input sequence for downstream processing by a natural language processing pipeline.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With further reference to FIG. 1, in an embodiment, at least a processor 108 may be configured to combine the contextual representation 140 with structured data 164 of the input response 126 to form a unified representation 166. For purposes of this disclosure, a "unified representation" is a fused data structure that integrates both semantic and syntactic information extracted from unstructured textual input 130 with structured metadata elements into a single, vector-based format. This fused representation may facilitate more comprehensive analysis by enabling downstream models or modules to operate on a multimodal input that reflects both user-expressed sentiment and quantifiable contextual attributes. In some embodiments, the structured data 164 may be appended to or embedded within the same vector space used to encode the contextual representation 140, such that each feature, whether derived from free-form text or structured input, is aligned in dimensionality for compatibility in transformer-based or deep learning architectures. Alternatively, the structured data 164 may be processed using a parallel encoding pipeline and then concatenated or merged with the contextual representation 140 using learned projection layers, attention-based fusion mechanisms, or dimensionality alignment techniques. By forming a unified representation 166, system 100 can enhance the specificity, interpretability, and predictive power of feedback analysis operations. For instance, a user's statement that a "new workflow is confusing" may be interpreted differently if the structured data 164 reveals that the user is a first-time participant, is using a mobile interface, or experienced the change during a low-support period. Merging this information into a unified representation 166 allows salience scoring engines, clustering modules, or prioritization models to weigh qualitative and quantitative signals in context.

With continued reference to FIG. 1, in an embodiment, the merging of the contextual representation 140 with the structured data 164 of the input response 126 to form the unified representation 166 may be performed by a fusion module. For purposes of this disclosure, a "fusion module" is a computational component configured to align, integrate, and synthesize heterogeneous data types. The resulting unified representation 166 may include a consolidated embedding space or feature vector that reflects both the semantic content of the user's free-text input and the associated structured metadata (e.g., user role, timestamp, platform, or predefined survey selections). In various embodiments, the fusion module may employ different architectural techniques to perform this merging. In one embodiment, the fusion module may utilize concatenation-based fusion, wherein the contextual representation 140 and the structured data 164 vector are directly concatenated along a shared feature dimension. The concatenated vector may then be passed to a downstream module such as a feedforward neural network, classification layer, or transformer decoder. In another embodiment, the fusion module may implement attention-based fusion, wherein the structured data 164 is used as an attention query or key, enabling the model to weight specific portions of the contextual representation 140 more heavily depending on the structured context. In yet another embodiment, the fusion module may employ projection-layer fusion, in which the contextual representation 140 and structured data 164 are each passed through separate projection layers, such as linear transformation layers or multilayer perceptrons, and the resulting vectors are combined using an element-wise operation (e.g., addition, multiplication, or learned weighted averaging). In some cases, graph-based fusion techniques may be applied, wherein unstructured and structured features are encoded as nodes or attributes within a heterogeneous graph, and a graph neural network is used to produce the unified representation 166. Alternatively, in more advanced architectures, the fusion module may form part of a multimodal transformer, in which structured and unstructured inputs are jointly embedded and processed using shared attention mechanisms. In such embodiments, modality-specific embeddings or type-indicator tokens may be used to distinguish between the input types.

In further reference to FIG. 1, in an embodiment, the particular fusion technique used may be selected based on system constraints, expected response complexity, or empirical model performance. For example, attention-based fusion may be advantageous in cases where structured metadata provides strong cues for interpreting the user's textual input 130, such as when interpreting feedback from users of different roles or access levels. Conversely, simple concatenation-based fusion may suffice in settings where structured fields provide supplemental but non-critical information, such as timestamps or interaction channels. Regardless of the method used, the output of the fusion module, the unified representation 166, may serve as an enriched input for downstream components responsible for clustering, salience analysis, or prioritization scoring.

Still referring to FIG. 1, in an embodiment, the fusion module may operate downstream of the NLP model's 128 core language processing components, such as the embedding layer 136 and language model encoder. Specifically, the NLP model 128 may first processes the textual input 130 by generating a sequence of embeddings 134, which are then passed through at least one layer of a language model 138 (e.g., a transformer encoder) to produce a contextual representation 140. This contextual representation 140 may capture semantic and positional dependencies across the input sequence. Once this representation is generated, the fusion module may integrate it with structured data 164 associated with the input response 126 to form the unified representation 166. In some embodiments, the fusion module may receive outputs directly from the final encoder block of the language model and align them with structured inputs that may not have been seen by the NLP model 128 during initial encoding. In other embodiments, structured data 164 may be introduced earlier (e.g., embedded jointly with text tokens) and influence the NLP model's 128 internal attention mechanisms. Regardless of placement, the fusion module may complement the NLP model 128 by enhancing semantic representations with contextual metadata, enabling system 100 to generate richer, more context-aware downstream outputs, such as issue clusters or prioritization scores 168.

With further reference to FIG. 1, in an alternative embodiment, the fusion module may be integrated directly within the NLP model pipeline, enabling earlier and more holistic modeling of structured and unstructured input components. In such configurations, structured data 164 associated with the input response 126, such as categorical tags, numerical metrics, timestamps, or user role indicators, may be embedded alongside or fused with text-derived tokens at the input stage. These structured components may be transformed into dense vector representations and concatenated or interleaved with text token embeddings before being passed through the NLP model's 128 encoder layers. This integrated approach may allow the attention mechanisms of transformer-based models to attend jointly to both linguistic context and structured metadata, enabling the generation of contextual representations 140 that are inherently aware of external conditions or metadata. For example, when a user describes a system update in free-text form, and their role (e.g., support engineer) is included as structured data 164, the NLP model 128 can learn to weight terms differently based on the structured context. The result is a unified representation 166 that emerges directly from the model's hidden states and reflects a richer, semantically fused interpretation of the original input response 126.

In continued reference to FIG. 1, in an embodiment, at least a processor 108 may be configured to combine a plurality of contextual representations 142 using an integration engine 144 to form an integrated representation 146. For purposes of this disclosure, an "integration engine" is a software-implemented module or collection of routines that programmatically fuses plurality of contextual representations 142 into a composite data object. In some embodiments, the contextual representations 142 may include unified representations 166, which combine structured data 164 with semantic embeddings generated by the NLP model 128. By including both raw textual context and structured metadata in each representation, the integration engine 144 can more accurately detect convergence, divergence, or anomaly across input responses 126. In certain embodiments, the integration engine 144 may implement attention-based weighting, clustering heuristics, or dimensionality reduction techniques to identify similarities and differences across the individual contextual or unified representations 166 prior to combining them. For example, if multiple users independently submit input responses 126 reflecting confusion over a new workflow, the integration engine 144 may detect semantic overlap between their respective representations and consolidate these into a dominant signal of workflow misalignment. The resulting integrated representation may capture the distribution, frequency, and salience of core concepts or issues emerging from the aggregated feedback. For purposes of this disclosure, an "integrated representation" is a unified vectorized structure.

With continued reference to FIG. 1, in some embodiments, the integration engine 144 may further be configured to incorporate role-based or temporal stratification when forming the integrated representation 146. For instance, representations derived from users tagged as administrators may be weighted differently than those from end-users, or feedback collected shortly after a system change event 118 may be prioritized differently than feedback collected after prolonged exposure. The integrated representation 146 may serve as a high-level abstraction layer that feeds downstream modules such as the salience-ranking engine 176, dashboard interface, or re-query generation logic. In this way, the integration engine 144 may function as a pivotal intermediary between distributed user-level feedback and centralized system-level adaptation.

In further reference to FIG. 1, in further embodiments, the integration engine 144 may utilize a matrix-based similarity function or kernelized alignment operation to compare latent semantic vectors across the plurality of contextual representations 142. Each contextual representation 140 may be embedded into a shared vector space, either through use of a common encoder or projection layer, wherein cosine similarity, Euclidean distance, or learned metric functions are applied to identify semantically proximate clusters. Once clusters are established, the integration engine 144 may apply weighted averaging, max pooling, or transformer-style cross-attention across the grouped vectors to yield a representative embedding for each cluster. These representative embeddings may then be concatenated, interpolated, or hierarchically pooled to form the final integrated representation 146. Optionally, the integration engine 144 may incorporate noise reduction layers, such as dropout regularization or sparsity constraints, to minimize overfitting to anomalous signals and emphasize generalizable patterns across the distributed user feedback. This technical architecture may enable scalable, accurate synthesis of rich semantic information from diverse and variably structured sources of user response data.

With further reference to FIG. 1, in an embodiment, at least a processor 108 may be configured to generate a structured feedback object 148 as a function of the integrated representation 146, wherein the structured feedback object 148 includes at least one response cluster 150. For purposes of this disclosure, a "structured feedback object" is a data construct that encapsulates the results of system-wide feedback analysis in a standardized, queryable format suitable for downstream analytics and visualization. The structured feedback object 148 may include metadata fields (e.g., timestamps, origin of query, user segment), statistical summaries, and data structures representing clusters of semantically or topically similar input responses 126. In an embodiment, the at least one response cluster 150 may include a plurality of response clusters. A "response cluster," for the purposes of this disclosure, is a grouped set of input responses 126 that share a high degree of semantic similarity or contextual alignment. For example, the plurality of response clusters may include a first response cluster 172 representing responses expressing confusion about a new scheduling tool, and a second response cluster 174 representing responses voicing approval for increased automation in task routing. Each response cluster may retain linkage to the original contextual or unified representations 166 it was derived from, thereby preserving traceability and allowing drill-down inspection at the level of individual input responses 126. In various embodiments, at least a processor 108 may assign cluster identifiers, salience scores, or representative phrases to each response cluster within the structured feedback object 148. This may allow the structured feedback object 148 to act as a compressed yet expressive summary of user sentiment, experience, or perception following a detected system change event 118.

With further refence to FIG. 1, in some embodiments, response clusters may be generated using unsupervised or semi-supervised machine-learning techniques applied to the integrated representation 146. For example, system 100 may employ algorithms such as k-means clustering, hierarchical agglomerative clustering, DBSCAN, or Gaussian mixture models to group representations that exhibit dense proximity in high-dimensional vector space. Alternatively, topic modeling approaches such as Latent Dirichlet Allocation (LDA) or BERTopic may be used to identify latent themes across user feedback. As a result, the structured feedback object 148 may contain clusters such as: (1) a group of responses identifying confusion over newly added workflow automation steps; (2) a cluster centered on complaints about permission errors following a policy update; (3) a set of affirmations indicating improved efficiency due to recent interface changes; and (4) a cluster of delayed feedback pointing to adaptation over time. These clusters not only reflect semantic similarity but may also be stratified by roles, departments, or temporal windows. In some embodiments, cluster membership may be soft-assigned using probabilistic models, enabling a single input response 126 to contribute to multiple clusters with varying degrees of confidence. The use of such clustering techniques facilitates high-resolution interpretation of distributed user experience signals and supports prioritization in downstream remediation or design refinement.

In continued reference to FIG. 1, in some embodiments, the prioritization of issues within response clusters may be guided not only by linguistic salience but also by alignment with organizational strategy. For example, system 100 may include a strategic alignment module that encodes business objectives such as annual priorities, three-year goals, and competitive positioning targets. This module may compare the semantic content of a response cluster against these encoded strategic benchmarks to assess relevance. Applying principles such as the Pareto rule (i.e., the 80/20 principle), the system may suppress noise-level issues and elevate clusters likely to impact the top 20% of objectives that drive 80% of meaningful outcomes. In this way, salience scores may be weighted to favor signals that correspond to strategic blockers, accelerators, or emerging risks. Strategic weighting may also inform query design and follow-up engagement, enabling the system to clarify whether a given issue materially hinders progress toward mission-critical initiatives before surfacing it in the dashboard interface.

With further reference to FIG. 1, in some embodiments, strategic business objectives may be encoded into system 100 through one or more input pathways. For example, business priorities, such as annual performance goals, long-term strategic differentiators, or cross-functional initiatives, may be manually entered by administrators using a configuration interface or uploaded from structured planning documents. In other embodiments, a strategy ingestion module may parse data from enterprise sources such as strategic planning decks, internal wikis, executive briefings, or meeting transcripts to extract recurring goal-aligned phrases and convert them into machine-readable embeddings. These embeddings may be updated periodically and used by the salience-ranking engine 176 to assess the alignment of response clusters with known strategic drivers. In hybrid embodiments, system 100 may begin with administrator-provided inputs but refine its internal representations through training data, supervised learning, or reinforcement loops. A language model or transformer-based architecture may assist by recognizing semantically equivalent expressions of strategic intent, enabling system 100 to correctly associate user-generated feedback with high-priority initiatives even when wording diverges from the original goal statements. This layered encoding process may enable responsive, strategy-aware prioritization that evolves with the business context.

With continued reference to FIG. 1, in some embodiments, system 100 may include a traceability mechanism to log the rationale behind strategic alignment determinations for each response cluster. This traceability may include metadata indicating which encoded strategic objective(s) the response cluster aligned with, the semantic distance threshold used to determine relevance, and a weight indicating the relative influence of each factor. For example, if a user-submitted concern about a reporting dashboard's usability is surfaced as a high-priority issue, system 100 may log that this concern maps semantically to a strategic initiative related to cross-functional data transparency. In an embodiment, system 100 may further include an optional explanation interface or administrator dashboard pane in which these mappings can be reviewed, audited, or refined by organizational leads. This supports human-in-the-loop oversight and provides transparency into how the feedback system integrates organizational goals with distributed sentiment data, fostering trust and enabling iterative tuning of strategic encoding or priority alignment parameters.

In further reference to FIG. 1, in an embodiment, at least a processor 108 may be configured to determine a prioritization score 168 for the at least one response cluster 150 as a function of a salience value 170 of the at least one response cluster 150. For purposes of this disclosure, a "salience value" is a computed metric that reflects the degree of informational significance, uniqueness, or urgency represented within a response cluster. In an embodiment, salience value 170 may be determined based on content features such as frequency, semantic deviation from baseline, relevance to the system change event 118, and/or alignment with predefined key issue categories. A "prioritization score," by contrast, is a downstream numerical or categorical value. In an embodiment, the prioritization score 168 may be used to guide system-level response actions, triage decision-making, or visual emphasis within a feedback dashboard, and may be derived at least in part from the associated salience value 170 of a response cluster. In some embodiments, the salience value 170 may be determined by evaluating a variety of linguistic and statistical features within the cluster, such as the presence of sentiment polarity extremes, clustering density, domain-specific keywords, or syntactic divergence. The prioritization score 168 may additionally incorporate contextual or policy-based weighting logic, for example, boosting clusters that include critical system terms, administrator-level feedback, or those emerging during high-risk operational windows. The resulting prioritization score 168 may be used to direct further actions, including the ordering of follow-up queries, highlighting of high-priority issues in a dynamic interface, or the automated triggering of escalation workflows for anomalous or high-risk feedback clusters.

With continued reference to FIG. 1, in some embodiments, determining the prioritization score 168 based on the salience value 170 may include executing a multi-stage ranking procedure implemented by at least a processor 108. First, at least a processor 108 may receive a calculated salience value 170 associated with each response cluster from the salience-ranking engine 176. The salience value 170 may be normalized across all clusters to ensure comparability on a shared scale, such as through min-max normalization or z-score standardization. Next, at least a processor 108 may apply a weighting function to the normalized salience value 170 based on system-specific criteria, such as user role (e.g., administrator vs. end-user), timing of the response (e.g., proximity to the system change event 118), or alignment with predefined escalation categories. At least a processor 108 may then compute a composite prioritization score 168 by summing or averaging the weighted values or by applying a learned ranking model, such as a gradient boosting ranker or logistic regression classifier trained on historical response importance data. In some implementations, thresholding may be used to convert the prioritization score 168 into categorical tiers (e.g., "low," "medium," "critical"), which may then trigger downstream actions or visual indicators. This approach may enable dynamic, data-driven prioritization that adapts to contextual variables and historical impact patterns while preserving traceability and interpretability.

Still referring to FIG. 1, in an embodiment, determining the prioritization score 168 for the at least one response cluster 150 may include ranking the first response cluster 172 against the second response cluster 174 as a function of the salience value 170 associated with each. In this context, "ranking" refers to a relative ordering process in which the processor assigns hierarchical significance to each response cluster based on comparative analysis of their computed salience values 170. For example, if the first response cluster 172 has a higher salience value 170 than the second response cluster 174, at least a processor 108 may assign a higher prioritization score 168 to the first response cluster 172, thereby placing it earlier in a ranked issue list or assigning it a higher urgency tag for downstream visualization or re-query logic. In an embodiment, at least a processor 108 may implement ranking through deterministic sorting algorithms (e.g., quicksort or heapsort), statistical scoring functions, or machine learning-based rankers (e.g., pairwise or listwise ranking models). In some embodiments, ranking may be constrained within predefined tiers or policy-defined bounds, for instance, ensuring that only the top five clusters are flagged for immediate escalation. Additionally, tie-breaking logic may be applied when two or more response clusters exhibit equivalent or near-equivalent salience values 170, using secondary criteria such as time of submission, respondent role, or confidence interval from the salience-ranking engine 176. This structured ranking process may facilitate the adaptive elevation of user feedback that reflects significant or emerging sentiment patterns.

With continued reference to FIG. 1, in some embodiments, the ranked response clusters may be transmitted to one or more downstream modules, including but not limited to a dynamic dashboard interface 178, a re-query generation engine, or a system alerting service. For instance, the structured feedback object 148 including the ranked clusters may be rendered within a user interface as an interactive list, where the top-ranked issues are visually elevated (e.g., through color coding, size emphasis, or fixed position) to guide attention toward high-salience concerns. In some implementations, threshold-based escalation logic may be applied, wherein clusters exceeding a predefined prioritization score 168 trigger automated notifications to administrative users or activate supplemental data collection workflows. Additionally, in embodiments involving continuous feedback monitoring, system 100 may periodically reevaluate and rerank clusters in response to new input responses 126, thereby enabling real-time prioritization updates. This integration may ensure that feedback with the greatest potential operational impact is surfaced first, supporting rapid iteration, improved situational awareness, and timely decision-making grounded in aggregated user sentiment.

In continued reference to FIG. 1, in an embodiment, at least a processor 108 may be configured to calculate the salience value 170 of the at least one response cluster 150 using a salience-ranking engine 176. For purposes of this disclosure, a "salience-ranking engine" is a software-implemented module configured to evaluate the relative importance, urgency, or relevance of individual response clusters based on a combination of linguistic, temporal, semantic, and contextual metrics. In an embodiment, the salience-ranking engine 176 may apply one or more algorithms such as TF-IDF scoring, named entity frequency analysis, transformer-based attention scores, or sentiment-weighted density functions to assess which response clusters are most likely to reflect significant user experiences or operational disruptions. In certain implementations, the salience value 170 of a response cluster may be calculated as a weighted composite of multiple dimensions, including (i) the frequency of issue-specific keywords across multiple responses in the cluster, (ii) the average intensity of sentiment expressed within the cluster (e.g., highly negative or urgent language), (iii) the diversity of user roles represented within the cluster, and (iv) the temporal proximity of the responses to the triggering system change event 118. In some embodiments, topic modeling techniques such as Latent Dirichlet Allocation (LDA) or dynamic topic modeling may be employed to detect emerging patterns and contribute to the salience scoring process. By quantifying the salience value 170 in this way, the salience-ranking engine 176 may enable system 100 to elevate clusters that are both semantically rich and operationally relevant, thereby improving the fidelity and responsiveness of downstream prioritization logic.

In continued reference to FIG. 1, in some embodiments, the salience-ranking engine 176 may include a modular architecture including at least a feature extraction layer, a scoring layer, and a ranking layer, each operatively connected to a local or distributed computer environment. The feature extraction layer may interface directly with the integrated or unified representations 166 and apply linguistic parsing, sentiment detection, named entity recognition, or domain-specific tagging to extract measurable attributes from each response cluster. These features may then be passed to the scoring layer, which assigns individual salience weights using predefined rules or learned model parameters, such as regression weights or neural network outputs. In some configurations, the scoring layer may incorporate outputs from pretrained models (e.g., BERT-based embeddings or attention scores) adapted through fine-tuning on labeled training data comprising historical feedback, escalation logs, or incident response records. The final ranking layer may sort the clusters in descending order of composite salience value 170, optionally applying thresholds or stratification heuristics based on organizational role, response timing, or confidence intervals. This modular architecture may enable flexible deployment and maintainability, allowing the salience-ranking engine 176 to evolve over time with updated rulesets, retrained models, or feedback-informed weight calibration.

With continued reference to FIG. 1, in an embodiment, at least a processor 108 may be configured to display, using a dynamic dashboard interface 178, the structured feedback object 148 as a function of a prioritization score 168. For purposes of this disclosure, a "dynamic dashboard interface" is a software-generated visual display environment. In an embodiment, the dynamic dashboard interface 178 may update in real time or near-real time based on changes in underlying data inputs. The dynamic dashboard interface 178 may present the structured feedback object 148, including a plurality of response clusters, organized according to their prioritization scores 168 to visually surface the most salient and impactful clusters for review by system administrators, product managers, or other decision-makers. In some embodiments, the dynamic dashboard interface 178 may implement interactive visual elements such as sortable tables, expandable cluster cards, heatmaps, or time-series graphs, which enable users to drill down into individual response clusters or filter results based on user role, response timing, or feedback category. For example, a high-priority response cluster regarding user confusion about a newly implemented workflow could be highlighted in red and pinned to the top of the dashboard, with tooltips or modals revealing underlying user comments, salience metrics, and related historical feedback. Other clusters may be grouped into thematic segments (e.g., usability issues, performance concerns, feature requests) with visual indicators such as badges, sentiment bars, or trend arrows showing whether concern levels are rising or falling over time.

In further reference to FIG. 1, in some embodiments, the dynamic dashboard interface 178 may include a signal-weighting module configured to assign a visual prominence score to each response cluster or integrated representation 146 based on its prioritization score 168 and additional contextual attributes. For example, clusters with higher salience values 170 and originating from diverse user roles (e.g., end-users and technical leads) may be emphasized more prominently using larger bounding boxes, bolder color schemes, or higher placement in a scrollable interface. The signal-weighting logic may optionally incorporate recency, frequency, and deviation metrics as additional weighting factors. In further embodiments, the dynamic dashboard interface 178 may support user-adjustable filtering criteria (e.g., by change event type, affected subsystem, or user department) to allow focused exploration of response clusters most relevant to the user's role or current review task.

With continued reference to FIG. 1, in further embodiments, the dynamic dashboard interface 178 may include cross-linked representations to system change events 118, allowing users to trace back a response cluster to the specific triggering configuration event, administrator action, or system update. A "Cluster Overview Panel" may show the prioritization score 168 alongside contributing factors, such as cluster size, average salience value 170, and role distribution of contributors (e.g., 75% of comments from frontline users vs. 25% from managers). Additionally, a timeline slider or time filter may allow viewers to assess how the prominence of certain feedback has evolved since the issuance of the context-sensitive query 122. This visualization capability may facilitate situational awareness, enabling users to make data-driven decisions grounded in distributed user sentiment and system impact. The dynamic dashboard interface 178 may also provide export functions, integration points with ticketing systems or analytics platforms, and permissions-based customization to tailor the presentation of feedback based on organizational hierarchy or workflow context.

In continued reference to FIG. 1, in some embodiments, the dynamic dashboard interface 178 may support interactive user actions, allowing stakeholders to annotate clusters, flag emerging issues, or initiate follow-up actions directly from the interface. For example, a product lead viewing a prioritized response cluster labeled "search function returns inconsistent results" may select a comment within the cluster and launch a task ticket in an integrated project management tool. Likewise, users may rate the usefulness of a cluster, leave administrator notes, or tag it with internal categories such as "Needs Action," "Resolved," or "Under Review," all of which may be logged and version-controlled within the system. In multi-user environments, the dynamic dashboard interface 178 may be equipped with collaborative features, such as shared views, change tracking, and user-specific annotations. For instance, different users, such as engineers, UX researchers, and compliance officers, may access role-filtered versions of the dynamic dashboard interface 178, with certain clusters or attributes visible or editable only to authorized personnel. A user role-based access control (RBAC) layer may enforce these distinctions. In such environments, system 100 may further implement real-time update propagation using web socket connections or server-sent events, enabling synchronized dashboards across users.

Still referring to FIG. 1, for mobile interface embodiments, the dynamic dashboard interface 178 may be rendered using responsive design techniques or dedicated mobile applications that preserve the hierarchical structure of the feedback clusters while optimizing display elements for smaller screens. Swipe-based navigation, icon-based prioritization badges, and touch-based filtering widgets may be provided to allow seamless exploration of the data. For example, a user reviewing dashboard insights while in the field might receive push notifications when a response cluster surpasses a salience threshold or when a new high-priority cluster emerges. To maintain accuracy and responsiveness, the dynamic dashboard interface 178 may be periodically or continuously updated as new input responses 126 are received, processed, and incorporated into existing or new response clusters. In some embodiments, updates to the dynamic dashboard interface 178 may be event-driven and triggered by the integration engine 144 or salience-ranking engine 176 upon finalizing an updated integrated representation 146. In other embodiments, a background refresh task may run at configurable intervals, polling the structured feedback store for newly ingested data. As new input responses 126 are processed and added to clusters, corresponding prioritization scores 168 and salience values 170 may be recalculated in real time or near-real time. The dynamic dashboard interface 178 may reflect these changes by repositioning clusters, updating metadata tags, or triggering visual cues such as flashing borders, highlight animations, or timestamped update banners. To minimize disruption, the dynamic dashboard interface 178 may also include a "recent updates" toggle or revision history pane, allowing users to review what has changed since their last session. These mechanisms ensure that the dashboard remains a live reflection of the evolving user feedback landscape, providing continuous visibility into high-impact concerns and enabling adaptive system governance based on real-time distributed intelligence.

With continued reference to FIG. 1, in some embodiments, the dashboard interface may be tailored for use in air-gapped or high-security environments, where real-time network connectivity is restricted. In such scenarios, dashboard updates may occur through scheduled batch processing or secure file-based imports, wherein new structured feedback objects 148 are compiled on an isolated staging server and then securely transferred to the display environment. Update triggers in these embodiments may be governed by policy-defined checkpoints, such as at the close of a review cycle or following administrative approval of incoming feedback. These workflows may be especially applicable in defense, healthcare, or infrastructure contexts, where compliance and data provenance are paramount. For systems subject to regulatory oversight, such as those governed by HIPAA, GDPR, or ISO 27001 standards, the dashboard system may include audit logging capabilities, encryption of sensitive metadata, and configurable access logs. Each dashboard update may be version-controlled and time-stamped, with lineage-tracking mechanisms linking each visualized response cluster back to the originating input response 126 (or set thereof). Optional features may include digitally signed update records or exportable reports that document the evolution of salience scores and prioritization decisions over time.

In continued reference to FIG. 1, in another variation, the dashboard update frequency may be cohort-based, meaning different user groups receive updates according to role, relevance, or operational cadence. For example, frontline supervisors might view near-real-time feedback clusters from their respective teams, whereas executive-level users may receive batched summaries that consolidate prioritized clusters across multiple departments. This tiered update approach helps balance visibility and information density, ensuring that users see only what is relevant to their decision-making scope. In some cases, to further enhance transparency and trust, the dashboard may provide contextual tooltips or expandable side panels that explain how each prioritization score 168 was computed, including salience inputs, weighting criteria, and timestamped contributions. This may allow users to trace why certain issues are surfaced, what data they are based on, and how they have evolved, supporting interpretability and accountability in decision workflows informed by user-driven feedback analytics.

With continued reference to FIG. 1, to support intuitive insight extraction, the dynamic dashboard interface 178 may implement a variety of visualization strategies tailored to the attributes of the structured feedback object 148 and associated prioritization scores 168. For example, response clusters may be displayed as ranked tiles or cards, each containing a summary of the representative user input, the computed salience value 170, and the current prioritization score 168. Where temporal trends are relevant, trajectory plots may illustrate how a cluster's salience or rank has changed over time, allowing users to distinguish between transient concerns and emerging patterns. In some embodiments, a confidence interval may be visually overlaid on each cluster's salience score to indicate the statistical variability or uncertainty associated with user sentiment. Heatmaps or node-link graphs may be used to depict thematic relationships between clusters, highlighting overlaps in concept space or co-occurrence in user narratives. Additionally, filtering controls may allow users to isolate clusters by department, role, submission time, or tag metadata, while interactive elements may enable drill-down into the full set of responses associated with a given cluster. These visualization techniques enable a layered view of distributed feedback, facilitating both high-level prioritization and deep-dives into user-experienced system change impacts.

In further reference to FIG. 1, in an embodiment, displaying the structured feedback object 148 may include retrieving the structured feedback object 148. In an embodiment, the structured feedback object 148 may be retrieved from a memory location accessible to system 100, such as a local cache, backend data store, or cloud-based storage service. The structured feedback object 148 may include a data structure that includes a plurality of response clusters, cluster metadata, alignment indicators, participation statistics, and temporal engagement signals that may be used in visualization generation pipelines as discussed in further detail below. Retrieval of the structured feedback object 148 may be initiated in response to a rendering request triggered by a user-initiated interface state change, such as selecting a specific dashboard module or time window. In some embodiments, the retrieval logic may further incorporate access control filters or user scope constraints to ensure that the retrieved data corresponds to the appropriate organizational unit, reporting level, or dashboard role.

With continued reference to FIG. 1, in an embodiment, displaying the structured feedback object may include extracting a subset of data elements as a function of a visualization schema associated with a selected graphical user interface module. For purposes of this disclosure, a "visualization schema" is a predefined or dynamically generated configuration. In some cases, the visualization schema may specify (i) which data fields should be extracted from the structured feedback object 148, (ii) how those data fields should be grouped or aggregated, and (iii) how the data should be visually encoded within a graphical component. For example, a bar chart module rendering department-level alignment may require a visualization schema that extracts department names as labels, alignment scores as numerical values, and engagement rates as optional styling metadata (e.g., color gradients or border thickness). A pie chart module may extract the same alignment scores but encode them as angular segments to depict proportional distribution. In some embodiments, the visualization schema may also include transformation rules (e.g., normalizing scores to a 0-100 scale) or layout parameters (e.g., axis orientation, label formatting). The visualization schema may be selected based on user role, active tab, or programmatic context, enabling modular and adaptive rendering across dashboard views.

In further reference to FIG. 1, in some embodiments, selection of the subset of data elements may be governed by a GUI module-specific binding layer, which maps each interface component to a corresponding visualization schema. When a user activates or navigates to a particular GUI module, such as a "Team Insights" view or "Strategic Pulse" dashboard, system 100 may identify a corresponding schema identifier that reflects the data requirements of that module. A schema resolution engine may then resolve this identifier to a concrete schema definition stored in memory or retrieved from a configuration service. This definition may include explicit field references (e.g., alignment_score, department_label, salience_weight), aggregation rules (e.g., average, sum, max), and any associated metadata tags used to annotate or style the visual output. In an embodiment, during extraction, the structured feedback object 148 may be traversed to locate and retrieve only those data fields specified in the resolved schema. For example, if the selected module corresponds to a "Department Alignment" visualization, the extraction logic may select department identifiers, alignment scores, and recent trend indicators, while omitting data fields related to strategic goals or narrative summaries. In some implementations, this selection process may be dynamically adjusted based on user-specific parameters (e.g., permissions or locale) or on interface state (e.g., active date range or filter condition).

With further reference to FIG. 1, in some embodiments, system 100 may support dynamic schema updates based on real-time interaction patterns, usage history, or context-specific rendering goals. For instance, if a user toggles between "Summary View" and "Detailed View" modes within a module, system 100 may update the visualization schema on-the-fly to expand or contract the subset of data fields extracted from the structured feedback object 148. These dynamic updates may be triggered by interface events or decision logic encoded in a presentation layer, and may result in modifications to the field selection, grouping strategy, or display constraints. The resulting visualizations are thus tailored not only to the active module, but also to user-specific workflows and adaptive rendering conditions. In other embodiments, a cascading schema logic may be implemented, wherein a base schema is defined for a parent module, and child components inherit and refine the schema for localized rendering. For example, a "Team Insights" module may define a base schema including organizational alignment scores, while individual team-level tiles may apply refinements such as filtering by team ID, adjusting score ranges, or appending status flags. This cascading model may enable modular visualization components to share a unified data source while supporting differentiated visual emphasis or granularity. Once the appropriate subset of data elements has been extracted according to the resolved visualization schema, including, in some cases, any dynamically applied updates or cascaded refinements, system 100 may proceed to serialize the data into a structured format compatible with a rendering engine, as described below.

In continued reference to FIG. 1, in an embodiment, displaying the structured feedback object may include serializing the subset of data elements into a structured format compatible with a rendering engine. Serialization may involve transforming the extracted data into a well-defined intermediate representation, such as a JSON object, XML structure, or in-memory data map, which may preserve hierarchical relationships, field labels, and associated metadata. This process may ensure that the rendering engine receives the input in a normalized and interpretable format, independent of the original internal data structure of the structured feedback object 148. In some embodiments, serialization may include preprocessing steps such as value normalization (e.g., scaling scores to a fixed display range), data type coercion (e.g., converting string-formatted timestamps into datetime objects), and tagging visual attributes (e.g., mapping alignment score thresholds to color codes). Additionally, identifiers for visual components, such as bar segments, pie slices, or axis labels, may be included in the serialized payload to guide the rendering engine in constructing the corresponding graphical elements. The serialized format may also carry schema identifiers or view context tags to allow the rendering engine to resolve styling instructions and component layout templates.

With continued reference to FIG. 1, in some embodiments, the serialized format may additionally include embedded styling attributes or rendering hints that influence how visual components are instantiated. These attributes may include properties such as color codes, opacity levels, border styles, font sizes, or animation parameters, which may be resolved by the rendering engine during visualization construction. For instance, alignment scores above a defined threshold may be encoded with a "success" color class, while low participation rates may trigger a warning badge or a dashed border. In an embodiment, system 100 may support compatibility with multiple types of rendering engines, including vector-based (e.g., SVG), raster-based (e.g., HTML5 Canvas), and GPU-accelerated (e.g., WebGL) engines. The choice of rendering engine may be configured based on performance requirements, device constraints, or the complexity of the visualization. For example, high-density visualizations such as salience-weighted response clusters may benefit from GPU-accelerated rendering for smoother interactions and responsive drill-down animations, while simpler dashboard modules may rely on DOM-based SVG rendering for portability and accessibility.

Still referring to FIG. 1, in an embodiment, displaying the structured feedback object may include rendering a graphical representation of the subset of data elements using the rendering engine, wherein visual attributes of the graphical representation are determined as a function of metadata contained in the structured feedback object. The rendering engine may consume the serialized payload described above and instantiate one or more visual components, such as bar charts, pie charts, scatter plots, status tiles, or narrative summaries, based on the data values and associated style directives. In some embodiments, the rendering process may involve mapping specific metadata fields from the structured feedback object 148 to visual encoding parameters. For example, a salience_weight field may determine the size or prominence of a response cluster bubble; an alignment_score field may dictate the color intensity or direction of a bar; or a feedback_category tag may influence grouping logic in a multi-series visualization. The rendering engine may apply layout constraints (e.g., grid alignment, responsive resizing) and overlay interactive elements such as tooltips, drill-down controls, or click-to-expand behavior. In certain implementations, the rendering engine may be modular and support declarative visualization definitions, allowing different dashboard views to share rendering infrastructure while differing in data schema and visual design. This abstraction layer may enable consistent and dynamic visual updates in response to new structured feedback data, without requiring hardcoded rendering logic for each module.

With further reference to FIG. 1, in an embodiment, displaying the structured feedback object may include rendering an alignment visualization within the dynamic dashboard interface, wherein the alignment visualization is related to at least two groups of user nodes. In an embodiment, the alignment visualization may be generated by selecting alignment-specific data elements, such as group identifiers, aggregated alignment scores, and salience indicators, from the structured feedback object 148. These values may be mapped to visual encoding parameters defined by an alignment visualization schema, which specifies how each group's alignment score is represented (e.g., as a bar height, color gradient, or pie segment angle). In some embodiments, the alignment visualization may include a comparative bar chart displaying alignment scores for each group side by side, enabling visual analysis of relative levels of alignment or misalignment across teams, departments, or regions. Alternatively, a pie chart or radial gauge may be rendered to illustrate the proportional alignment distribution between groups. Interactive elements, such as hover tooltips or clickable data points, may be integrated to reveal underlying metrics or context, such as recent feedback trends or specific response clusters contributing to a group's alignment score.

In such an embodiment, at least a processor 108 may be configured to compute for each group of the at least two groups of user nodes, an alignment score as a function of the plurality of contextual representations associated with each group of the at least two groups of user nodes. For purposes of this disclosure, an "alignment score" is a numerical indicator of how closely the collective input responses from a given group reflect coherence with a target goal, policy update, strategic directive, or system change event. In an embodiment, to compute the alignment score, at least a processor 108 may first retrieve the input responses 126 associated with user nodes belonging to the identified group and generate contextual representations 140 for each response using NLP model 128. These contextual representations 140 may include vectorized embeddings, topic probabilities, or salience annotations derived from language model encoders or transformer-based architectures. Once generated, the representations for a group may be aggregated using one or more statistical or semantic techniques, such as centroid averaging, clustering, or attention-based summarization. In an embodiment, the aggregated representation may then be compared to a reference representation corresponding to a desired or expected alignment profile, which may be manually configured, inferred from historical data, or dynamically generated in response to the detected system change event 118. A similarity function, such as cosine similarity, Euclidean distance, or a domain-specific alignment metric, may be applied to quantify the degree of alignment between the group's aggregated response representation and the reference. The resulting value may then be scaled, normalized, or weighted based on contextual metadata (e.g., participation rate or recency) to produce the final alignment score.

In continued reference to FIG. 1, in an embodiment, at least a processor may be configured to encode the alignment score for each group of the at least two groups of user nodes as a graphical element within a visualization schema associated with the alignment visualization. The encoding process may include mapping the computed alignment score to one or more visual parameters, such as height, width, radius, opacity, color, or orientation, based on the selected visualization schema. For example, in a vertical bar chart, the alignment score may determine the bar height for each group; in a heatmap, it may control the color saturation of each group's cell; and in a circular gauge, it may dictate the sweep angle or needle position. In some embodiments, at least a processor 108 may also apply threshold-based encoding rules to categorize alignment scores into tiers (e.g., "aligned," "partially aligned," "misaligned"), each associated with a predefined visual styling or iconographic cue. These visual encodings may be bundled into a structured rendering payload and transmitted to the rendering engine described above to generate the corresponding graphical elements. Additionally, metadata such as tooltips, trend indicators, or timestamps may be associated with each graphical element to enable interactive inspection, drill-down, or comparison across time. In an embodiment, the visualization schema may further define layout regions, group sorting logic, or responsiveness parameters to ensure that alignment scores across multiple user groups are displayed coherently, scalably, and with sufficient visual contrast to support decision-making. In some implementations, the encoded alignment scores may be integrated into broader dashboard views, alongside strategic metrics or response clusters, enabling holistic interpretation of group-level alignment trends.

Still referring to FIG. 1, in some embodiments, the dynamic dashboard interface 178 may further support accessibility features to ensure usability across a diverse range of user needs and device contexts. For instance, the dynamic dashboard interface 178 may implement WCAG-compliant design standards, including keyboard navigation support, high-contrast display modes, and screen reader-friendly markup for visually impaired users. In embodiments where the dashboard is accessed across varying form factors, such as desktops, tablets, or mobile devices, the dynamic dashboard interface 178 may utilize an adaptive layout engine to responsively reconfigure visual elements, preserving readability and interaction flow without sacrificing contextual integrity. Additionally, users may be provided with options to export the structured feedback object 148 or visual summaries into shareable formats such as PDF reports, CSV tables, or embeddable iframe widgets. This export functionality may preserve metadata, prioritization scores 168, and cluster annotations to support offline review, stakeholder presentations, or integration with other enterprise reporting tools. These features may collectively enhance the dashboard's role as a central, inclusive, and flexible feedback interpretation tool across organizational layers.

In further reference to FIG. 1, in an embodiment, at least a processor 108 may be configured to archive the structured feedback object 148 and associated metadata. For purposes of this disclosure, to "archive" means to persistently store data in a way that facilitates long-term retrieval, auditability, and retrospective analysis, while optionally deprioritizing it from active memory or live computation pipelines. The archiving process may include serialization of the structured feedback object 148 and compression of large cluster sets or contextual embeddings to optimize storage footprint. In some embodiments, the archive may be implemented using object storage systems such as AWS S3 or Google Cloud Storage, with tagging capabilities for efficient indexing by system change event 118 ID, cluster ID, user role, or temporal metadata. The archival module may also maintain cryptographic hashes or immutable logs (e.g., via append-only data structures) to ensure integrity and traceability of historical feedback, which is especially relevant in regulated environments. Optional embodiments may include schema versioning or ontology-based tagging to support semantic queries over archived datasets and to maintain compatibility with future updates to the integration engine 144, query generation framework, or NLP models 128. In some embodiments, archiving may be triggered by a lifecycle management policy that evaluates criteria such as elapsed time since collection, frequency of access, or resolution status of the associated system change event 118.

With further reference to FIG. 1, in an embodiment, at least a processor 108 may be configured to update the query engine 120 as a function of stored structured feedback and associated metadata. This update process may leverage analytical models or rule-based decision trees to extract trends, identify patterns in response behavior, or surface recurrent signals from archived response clusters. For example, if analysis of historical salience scores reveals that a specific terminology or framing consistently produces higher-quality or more actionable input responses 126, the query engine 120 may automatically integrate that phrasing into future query templates. In some embodiments, at least a processor 108 may utilize a feedback retraining module to update model weights or heuristics embedded within the query engine 120 using archived data, either periodically or on-demand, thus allowing system 100 to adapt even in the absence of new user responses. Additionally, metadata from the archive, such as role-specific engagement trends, re-query success rates, or topic drift over time, may be used to refine dynamic time intervals 160, user segmentation logic, or impact filters (e.g., context modulation layers 162) used in query generation. By incorporating archived feedback into the adaptive control logic of the query engine 120, the system enables longitudinal learning and forward-compatible query refinement, ensuring that historical context informs future system interactions even as organizational structures or workflows evolve.

In continued reference to FIG. 1, in some embodiments, archived structured feedback objects 148 and their associated metadata may be used to implement a retraining loop for components of system 100, including the query engine 120, NLP model 128, salience-ranking engine 176, or integration engine 144. The retraining loop may be orchestrated on a scheduled or event-driven basis and may use labeled or semi-supervised data extracted from previously clustered or ranked response sets. For instance, user-confirmed relevance tags, sentiment annotations, or administrative resolution outcomes may serve as training signals for fine-tuning attention weights or re-calibrating classification thresholds. Archived feedback may be filtered by role, time window, or topic, enabling targeted retraining campaigns, for example, adapting the NLP model's 128 embeddings to better recognize domain-specific jargon or evolving organizational terminology. In certain embodiments, retraining may be handled offline and deployed to the production system once a performance benchmark is satisfied, with safeguards in place to prevent regression in live query interpretation or salience inference.

With further reference to FIG. 1, to further enhance the adaptivity of the query engine 120 and the salience-ranking engine 176, system 100 may monitor and analyze user engagement metrics tied to both live and archived response data. In a non-limiting example, user engagement metrics may include, but are not limited to: response rates, average time-to-respond, depth of response (e.g., word count or topic complexity), sentiment distribution, re-query acceptance rate, and follow-up participation frequency. These metrics may be collected at the level of individual queries, user roles, or over aggregated time periods, and may be stored alongside the corresponding structured feedback object 148. In some embodiments, engagement metrics may be used to weight salience values 170 or inform dynamic time intervals 160 for query issuance. For example, if user nodes from a particular team or role consistently demonstrate low engagement with late-issued queries, system 100 may reduce delay thresholds or modify query prompts accordingly. User engagement metrics may also be used to surface underrepresented or declining signal clusters in dashboard views, aiding administrators in prioritizing re-engagement or investigation.

In further reference to FIG. 1, in an embodiment, system 100 may include logic for reactivating archived response clusters under specific triggering conditions. For example, if a newly detected system change event 118 matches historical parameters previously associated with high-salience response clusters, such as a rollback of a prior interface or policy reinstatement, system 100 may retrieve and resurface relevant archived clusters for reference or comparison. Reactivation logic may also be applied when system 100 detects a novel feedback signal that bears semantic similarity (e.g., using cosine similarity or cluster overlap thresholds) to past archived clusters, indicating a potential recurrence of a previously observed issue. Upon reactivation, system 100 may present the previously archived contextual representations 140 and associated metadata within the dynamic dashboard interface 178, annotated with historical resolution notes, cluster salience scores, or original response timestamps. In some embodiments, reactivated clusters may trigger automated re-query logic or prompt manual administrative review, ensuring that valuable institutional knowledge encoded in past feedback is not lost across iterative system changes.

Figure 2A:
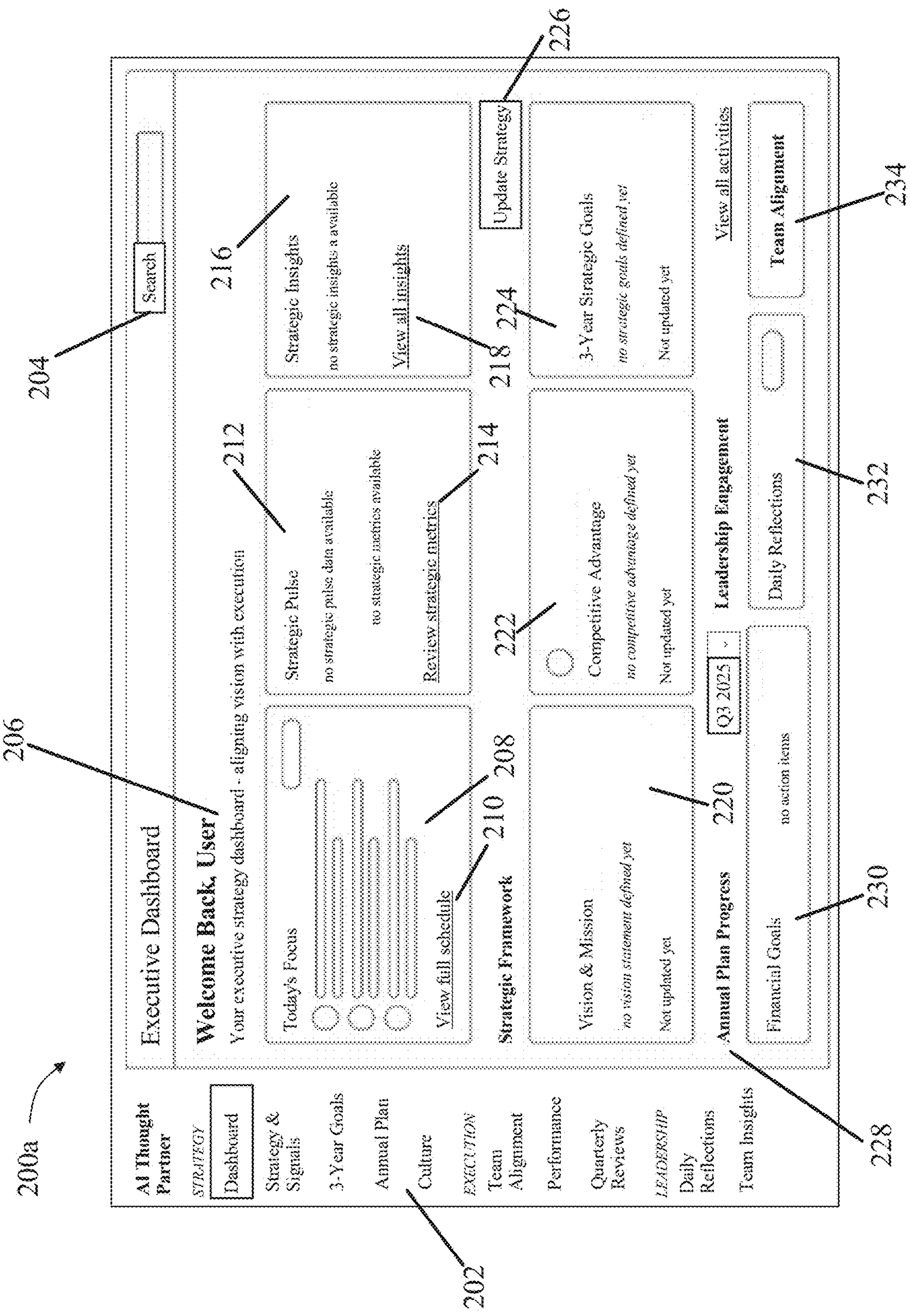
FIG. 2A is an exemplary embodiment of an executive dashboard interface.

Referring now to FIG. 2A, illustrated is an exemplary embodiment of an executive dashboard interface 200*a* configured to surface contextually relevant, goal-aligned feedback insights. The interface 200*a* is structured to present strategy-related modules in a user-friendly layout, enabling efficient review of operational progress and leadership engagement. Interface 200*a* may be one embodiment of the dynamic dashboard interface as discussed in FIG. 1.

Still in reference to FIG. 2A interface 200*a* may include a vertical navigation pane 202 located along the left-hand side of the interface. The navigation pane 202 may display categorized menu options allowing the user to switch between interface modules. Non-limiting examples of selectable menu categories shown in FIG. 2A include: "Dashboard," "Strategy & Signals," "3-Year Goals," "Annual Plan," "Culture," "Team Alignment," "Performance," "Quarterly Reviews," "Daily Reflections," and "Team Insights." Each menu item may correspond to a separate interface screen configured to retrieve and display domain-specific feedback or system data aligned with the user's role and authorization level.

In continued reference to FIG. 2A, a search bar 204 may be positioned in the upper right corner of interface 200*a*. The search bar 204 may enable real-time querying across aggregated structured feedback objects, individual response clusters, goal definitions, and action items. In some embodiments, the search bar 204 may support keyword prediction, fuzzy matching, and semantic similarity logic for retrieving relevant insights. In some cases, a personalized welcome banner 206 may be shown below the navigation header. In some embodiments, the banner 206 may be dynamically generated and personalized to the active user (e.g., "Welcome back, Geoff") based on authentication credentials or user preferences. The banner may also include a subtitle that reinforces strategic intent; for example, "Aligning vision with execution."

With further reference to FIG. 2A, interface 200*a* may include a plurality of modules. These modules may be configurable by a user and/or may be static. In some cases, the plurality of modules may visualize various insights as related to a specific user or user-affiliated organization. For example, a task and scheduling module 208 may be provided as a card under "Today's Focus." Module 208 may visually enumerate prioritized focus areas or tasks for the current day, potentially derived from system-detected bottlenecks, assigned goals, or previous action items. Individual tasks may be displayed as rows with circular status indicators, and the module may include a "View full schedule" link 210 that navigates the user to a more detailed timeline or calendar interface. In an embodiment, generating the task and scheduling module 208 may include executing a rendering pipeline configured to retrieve, rank, and format task-relevant data associated with a user or organization profile. At least a processor may be configured to access one or more structured data sources containing task assignments, calendar events, user action history, and system-generated bottleneck alerts. A task prioritization engine may apply rule-based or machine-learning-based logic to this data, evaluating attributes such as due date proximity, task importance scores, recent interaction frequency, and alignment with user-defined goals. The resulting prioritized task list may be serialized into a module content object containing display metadata for each task, including label text, completion status, urgency flags, and associated icons. A rendering engine may then generate a module layout using a template corresponding to the "Today's Focus" section, binding each task in the module content object to a visual row element with a circular status indicator and associated interactivity hooks. In some embodiments, task items may include embedded links or event handlers that support user navigation to task detail views or scheduling interfaces. The "View full schedule" link 210 may be dynamically rendered based on whether additional calendar entries are present beyond those shown in the focus view.

With continued reference to FIG. 2A, in some embodiments, the rendering of module 208 may further incorporate customization logic that allows individual users or administrators to configure the visibility, order, or filtering criteria of tasks displayed within the module. A personalization engine may store user preferences in a persistent configuration object, which may be queried by the rendering pipeline at runtime to selectively include or exclude certain task types, categories, or source systems. In organizational contexts, module 208 may be filtered based on the user's role, access level, or department affiliation. For example, an operations manager may be shown system-wide alerts and team-level escalations, while a front-line user may see only personal action items or workflow tasks directly assigned to them. Role-based filtering may be implemented through a policy engine that resolves task visibility constraints against a user context profile. To support up-to-date task status within module 208, the system may include a real-time synchronization layer, such as a WebSocket-based subscription channel or a long-polling routine. This layer may listen for task updates, completions, or reassignments originating from external systems or user interactions, triggering a re-render or partial module refresh to reflect the most current task state without requiring a full page reload.

In continued reference to FIG. 2A, in some embodiments, each task displayed within module 208 may be associated with a task metadata object that includes audit and provenance attributes. These attributes may include a task origin identifier, source system reference, creation timestamp, assigned user ID, and last-modified timestamp. The system may be configured to log user interactions with the module, such as task completion toggles, navigation clicks, or rescheduling actions, within an audit trail linked to the user profile. Such audit events may be stored in a secure, append-only logging infrastructure to support compliance, traceability, and retrospective analysis of task engagement. Provenance data may be used to display contextual tooltips or trace indicators within the UI, identifying whether a task was user-generated, manager-assigned, or automatically inferred from system analytics. In some embodiments, module 208 may be integrated with external scheduling systems or productivity platforms using API connectors. These connectors may support bidirectional synchronization of task states with third-party systems such as calendar APIs (e.g., Google Calendar, Microsoft Outlook), project tracking tools (e.g., Jira, Asana), or enterprise ticketing systems. This integration layer may include authentication management, rate limiting, and data transformation pipelines to ensure consistency and reliability across system boundaries.

With further reference to FIG. 2A, in some embodiments, tasks displayed within module 208 may be managed according to a lifecycle state machine, wherein each task progresses through a defined sequence of states, such as "Not Started," "In Progress," "Blocked," "Completed," or "Deferred." Transitions between task states may be triggered by user interactions, automated rules, or external system events, and may optionally include transition conditions or escalation logic. The state machine framework may be implemented using a rules engine or workflow orchestration service, enabling traceable and predictable task evolution. Notification hooks may be bound to specific task states or transitions; for example, a task marked "Blocked" may trigger a real-time alert to a supervising user, while completion of a high-priority task may generate an acknowledgment message or audit event. In some embodiments, data permission controls may be applied at the task level or module level, such that visibility, modification, or escalation privileges are restricted based on user role, team affiliation, or security clearance. These controls may be enforced by a policy evaluation layer at render time and may support row-level access filtering, inline masking of sensitive content, or disabled interaction elements for unauthorized users. This permission-aware rendering may ensure that task data surfaced in module 208 is consistent with organizational access policies and individual user entitlements.

In further reference to FIG. 2A, in an embodiment, interface 200*a* may include a strategic pulse module 212, which may display key performance indicators and signals related to strategic execution. The strategic pulse module 212 may be configured to display synthesized metrics related to strategic execution, user alignment, and engagement dynamics. In an embodiment, these metrics may be derived from structured feedback objects and response clusters generated by the NLP model and integration engine. Strategic pulse module 212 may display data such as aggregate engagement scores, response volume trends, or misalignment indicators calculated from normalized input responses submitted by users across distributed nodes. In this embodiment, placeholder text indicates "No strategic pulse data available," but in live environments, metrics such as engagement scores, feedback frequency, or directional trends may be shown here. The metrics may be surfaced by computing salience-weighted statistics over prioritized response clusters, optionally filtered by event category, time window, or user role. A call-to-action link 214 labeled "Review strategic metrics" may trigger navigation to a deeper metrics view, which may present raw values, historical graphs, or drill-downs grouped by operational domains or system change event types. In an embodiment, activation of call-to-action link 214 may trigger a metrics generation pipeline that retrieves and renders strategic feedback metrics associated with a defined time interval or event scope. At least a processor may be configured to query structured feedback objects previously generated from aggregated user input responses. These structured feedback objects may include metadata fields such as event category, timestamp, response cluster ID, user role distribution, and salience scores derived from the salience-ranking engine. To compute raw metrics, the system may aggregate numeric fields across response clusters (e.g., average salience value, cluster density, or polarity spread) and apply statistical normalization across temporal bins or user segments. A time-series analytics module may construct historical trend graphs by grouping salience-weighted cluster metrics into discrete time intervals (e.g., hourly, daily, or weekly), optionally applying smoothing filters or changepoint detection algorithms to highlight significant shifts in user feedback. For drill-down views grouped by operational domains or event types, a classification layer may index response clusters by associated system change events, operational graph nodes, or policy domains, using tags assigned during initial processing by the configuration model or NLP model. Grouped metrics may be displayed using bar charts, heat maps, or table-based scorecards, and may be further filtered using interactive selectors tied to user role, department, or system region. The resulting view may provide end users or administrators with a real-time visualization of distributed user sentiment and engagement trends, grounded in the salience-ranked interpretation of system-altering events.

Further, in some embodiments interface 200*a* may include a strategic insights module 216, which may optionally present AI-generated summaries, trend narratives, or opportunity alerts derived from salience-ranked response clusters. These summaries may be generated by passing salience-ranked response clusters through a summarization model or narrative synthesis engine, optionally implemented as part of the salience-ranking engine or in conjunction with a large language model. Strategic insights may include trend narratives (e.g., "Users report improved clarity following new access protocol"), opportunity alerts (e.g., "High engagement detected around automation tools"), or anomaly flags. Each insight may be traceable to an originating response cluster and may include metadata such as a confidence score, originating event category, or time of generation. An interactive link 218 labeled "View all insights" may allow users to access a historical insights log, which may be stored in a searchable, timestamped database and filtered using query parameters such as role, topic, or system change event ID. In continued reference to FIG. 2A, interface 200*a* may include a row of tiles. In some cases, this may include a row of three tiles which may form a "Strategic Framework" block: a vision and mission module 220, a competitive advantage module 222, and a 3-Year Strategic Goals module 224. These modules may be configured to display high-level business objectives and directional anchors intended to contextualize user feedback and downstream strategy alignment. Each module may include a visual status indicator (e.g., an alignment bar, confidence icon, or alert badge) and a last-updated timestamp to signal freshness and provenance. In some embodiments, these fields may be populated through a combination of manual input and AI-assisted extraction from business documents, as previously disclosed. Specifically, at least a processor may access one or more source artifacts, such as uploaded business plans, strategic presentations, or mission statements, and pass them through an NLP model to identify semantically dense segments corresponding to organizational vision, competitive positioning, and strategic goals. The NLP model may generate a set of contextual representations which are then normalized, ranked, and filtered by the integration engine. The integration engine may be configured to resolve redundancy across documents, prioritize more recent or stakeholder-validated content, and structure the resulting outputs into a canonical representation suitable for rendering as part of the strategic framework. For instance, if a strategic document contains multiple goal statements with different time horizons, the system may identify those explicitly tagged or temporally anchored to a 3-year timeframe for display in module 224. In some embodiments, these extracted values may be reviewed and optionally edited by authorized users using a configuration interface before final rendering. The structured values may be persisted within a configuration store linked to the organizational profile and periodically re-evaluated when new source artifacts or alignment signals are ingested. Updates to the modules may also be triggered by changes in alignment indicators derived from salience-ranked response clusters, enabling a feedback loop between strategic declarations and user-expressed signals.

With further reference to FIG. 2A, in some cases, interface 200*a* may include a dynamic strategy update button 226 which may be displayed alongside the strategic framework. This interactive element may enable users with administrative privileges to modify encoded business priorities. Activating the button may launch an overlay or modal where users can input revised values or upload updated planning materials.

Still referring to FIG. 2A, in an embodiment, interface 200*a* may include an "Annual Plan Progress" section 228 which may visualize goal tracking for the current fiscal year. In an embodiment interface 200*a* may provide a dropdown menu allowing users to toggle through specific quarters of specific years. Submodules shown include financial goals 230, which indicate a status of "No financial goals available" in the present screenshot, along with placeholders for market goals and product goals. In some cases, interface 200*a* may include a "Leadership Engagement" block which may be presented alongside the annual plan, including a module for daily reflections 232, which may log and summarize executive sentiments or bottleneck commentary, and a team alignment module 234, which may hyperlink to a separate screen showing team-level feedback and strategic coordination metrics.

In some embodiments, individual modules such as 208, 212, 216, 220-224, and 232-234 may be interactive cards supporting click-through navigation, hover-based summaries, or real-time updates based on newly received structured feedback objects. The modular layout of the interface 200*a* supports adaptive content rendering across device formats and may dynamically reorder tiles based on user behavior or priority signals.

Figure 2B:
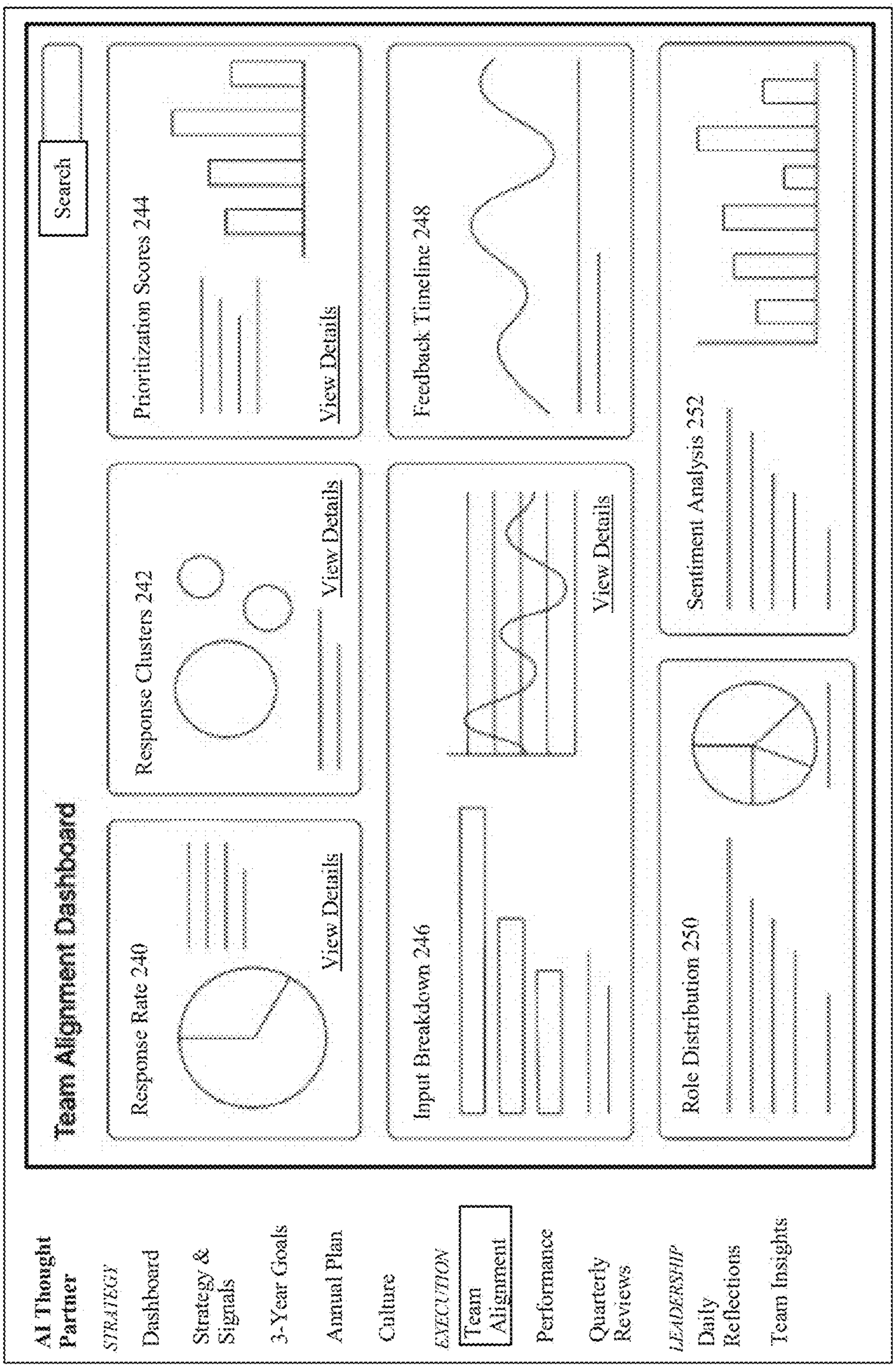
FIG. 2B is an exemplary embodiment of a team alignment dashboard interface.

Referring now to FIG. 2B, an exemplary embodiment of a team alignment dashboard interface 200*b* is shown. Interface 200*b* may be configured to display a structured and interactive representation of team-level feedback analytics in accordance with discussion in FIG. 1. The team alignment dashboard interface 200*b* may be generated as a function of integrated representations, structured feedback objects, prioritization scores, and role-based stratification operations executed by the NLP model, integration engine, and salience-ranking engine discussed previously with respect to FIG. 1. Each module within the dashboard may update in real-time or near-real-time as new input responses are received from distributed user nodes.

In continued reference to FIG. 2B, in an embodiment, dashboard interface 200*b* may include a Response Rate module 240. The Response Rate module 240 may be configured to visualize participation metrics for one or more context-sensitive queries issued by the system. At least a processor may be configured to calculate participation metrics using data collected from user nodes, specifically by identifying the total population of addressed users and cross-referencing it with the set of received input responses associated with a given system change event or reporting interval. Each input response may be tagged with metadata such as user ID, team affiliation, department, region, and timestamp, allowing the system to compute both overall response rates and stratified completion statistics. In an embodiment, the system may query a data store containing structured feedback objects, aggregate the metadata associated with completed responses, and compare it to a target population object, which may be inferred from role-based access models or prior notification logs. In some embodiments, the Response Rate module 240 may include a pie chart visualization configured to display the proportion of users who have completed a response versus those who have not, over a user-selectable reporting window. The pie chart may be dynamically generated using a chart rendering engine that consumes a serialized data object containing completion counts, non-completion counts and associated grouping labels. If stratification is enabled, the module may render segmented charts or apply color-coded slices to distinguish participation by team, department, or region. Each slice of the pie may be interactive, supporting hover-tooltips that reveal raw numbers and percentage values. A legend adjacent to the chart may visually differentiate response categories using predefined colors or icons. Additionally, a "View details" link may trigger a drill-down interface, which loads a tabular or bar-chart visualization of stratified metrics, allowing administrators to identify low-response segments or track engagement trends across organizational hierarchies. In some embodiments, response rate data may be refreshed in real time or at defined intervals, and a timestamp may be shown to indicate data currency. With further reference to FIG. 2B, in an embodiment, dashboard interface 200*b* may additionally include a Response Clusters module 242. Response Clusters module 242 may be configured to graphically display the output of the clustering logic applied to contextualized user feedback. As shown in FIG. 1, input responses collected from user nodes may be processed by an NLP model to generate contextual representations. These representations may then be normalized and semantically unified by the integration engine to produce a consistent embedding space across heterogeneous inputs. The system may then apply clustering algorithms such as k-means, DBSCAN, or hierarchical agglomerative clustering, to group these unified representations into a plurality of response clusters, each corresponding to a coherent feedback theme. These clusters, once generated, may be included in structured feedback objects 148 along with metadata such as cluster size, average salience score (computed, in some cases, using a salience-ranking engine), representative excerpts, and inferred feedback categories or topics. In an embodiment, the Response Clusters module 242 may visually represent each response cluster as a bubble or node in a two-dimensional layout. In some embodiments, the size of each bubble may be scaled proportionally to the number of constituent responses within the cluster or to a composite score based on salience and volume. The color, opacity, or border style of each bubble may correspond to an associated business objective, organizational priority, or sentiment classification derived from the clustered content. Selecting a "View clusters" control may activate a modal or detail pane showing representative user quotes, AI-generated summaries, and may optionally link to originating system change events. The graphical layout may be dynamically generated using a visualization engine and may support filtering, zooming, or reordering based on time, topic, or role-based permissions.

Still referring to FIG. 2B, in an embodiment, dashboard interface 200*a* may include a Prioritization Scores module 244. Prioritization Scores module 244 may display various visualizations, including, but not limited to bar graphs that visualize the relative prioritization scores calculated for different response clusters. These scores may reflect the output of the salience-ranking engine and incorporate multiple signals, including role weighting, alignment with strategic goals, and semantic density. In some cases, the bar height may represent overall importance, with tooltips or legends providing metadata such as response count or strategic alignment index.

With continued reference to FIG. 2B, in an embodiment, dashboard interface 200*b* may further include an Input Breakdown module 246 that in some cases visualizes the format and frequency of received user inputs. In an embodiment, bar charts may show response type distributions, such as structured vs. unstructured formats, or input segmentation, such as average sentence length or embedding sequence density. A side-by-side comparison or overlaid line graph may display NLP tokenization patterns or attention heatmaps derived from the embedding layer of the language model.

In further reference to FIG. 2B, in an embodiment, dashboard interface 200*b* may include a Feedback Timeline module 248 which in some cases may display a temporal graph of user feedback submissions or sentiment trajectories over time. In one embodiment, the timeline may visualize salience value fluctuation aligned with major organizational events, such as system change events or quarterly planning cycles. In some implementations, shaded overlays or labeled zones may indicate strategic milestones, such as annual goals or 3-year vision anchors. In some cases, dashboard interface 200*b* may include a Role Distribution module 250. The Role Distribution module 250 may in some cases, include a pie chart that categorizes the distribution of response clusters based on the roles of contributing users (e.g., executive, manager, contributor). This role stratification may be used by the integration engine to weight contributions when forming the integrated representation and assigning prioritization scores.

Still referring to FIG. 2B, in an embodiment, dashboard interface 200*b* may include a Sentiment Analysis module 252. This module may display a combined text-based summary and bar graph reflecting the sentiment distribution across feedback responses. Sentiment may be classified as positive, neutral, or negative based on transformer-based sentiment classifiers fine-tuned on organizational tone models. In some embodiments, a compound score or emotional polarity index may be visualized to signal urgency or morale shifts.

In an embodiment, each of modules 240-252 may be interactively configurable through the user interface. For example, users may select different time intervals, apply role filters, or annotate trends with contextual notes. The dashboard interface 200*b* may enable executive users to compare team engagement, surface blockers, and understand alignment with strategic goals. Updates to the modules may be driven by the backend processing of new input responses and realignment with evolving organizational strategies.

Figure 2C:
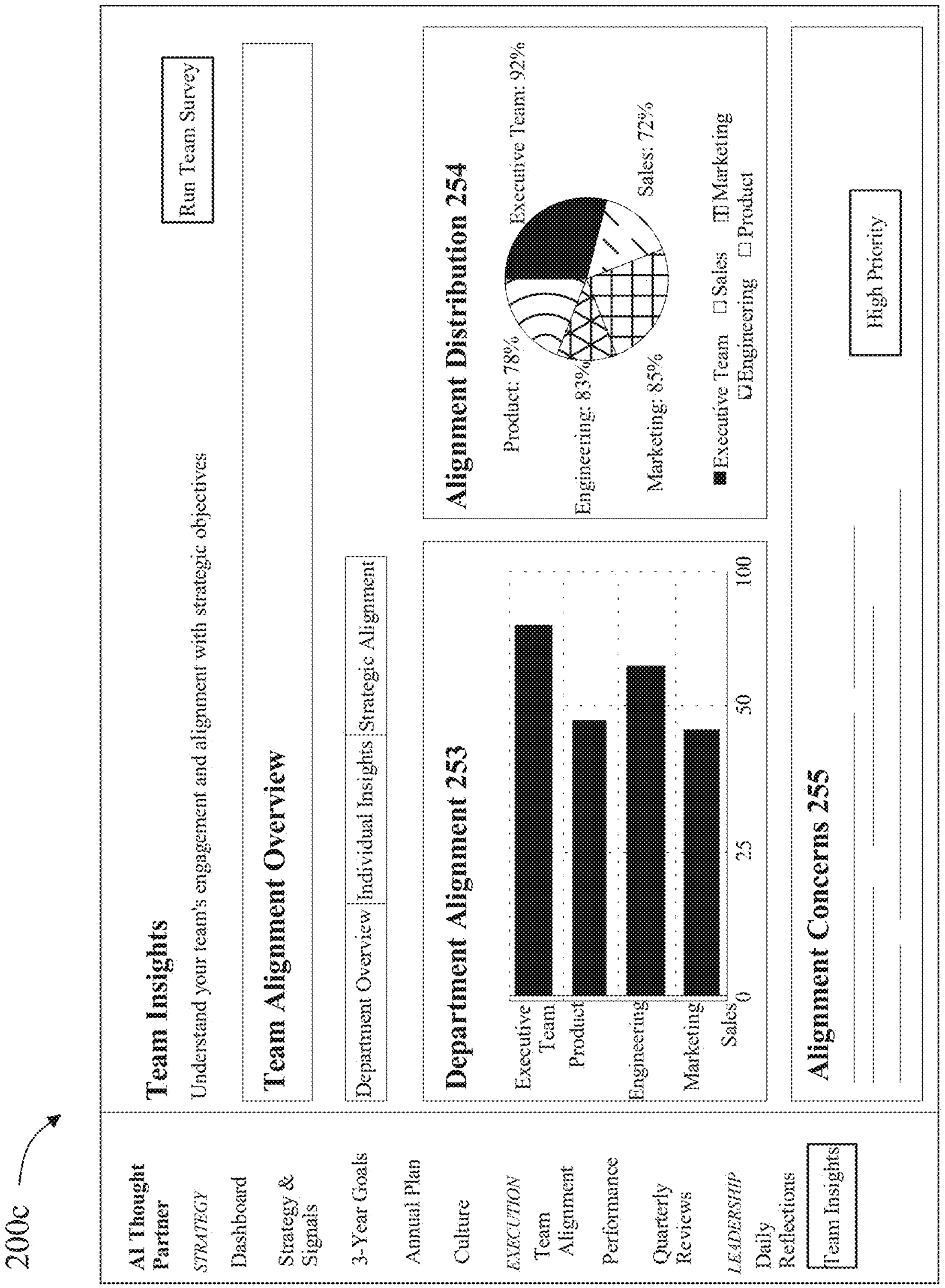
FIG. 2C is an exemplary embodiment, of a team insights dashboard interface.

Now referring to FIG. 2C, an exemplary embodiment of a team insights dashboard 200*c* is illustrated. In an embodiment, team insights dashboard 200*c* may include a graphical user interface configured to display structured feedback data related to organizational alignment across a plurality of departments or teams. Interface 200*c* may include at least a department alignment module 253, an alignment distribution module 254, and an alignment concerns module 255.

With further reference to FIG. 2C, in an embodiment, department alignment module 253 may include a horizontal bar chart configured to display normalized alignment scores across a plurality of departments. Each bar may correspond to a department or organizational unit and may be rendered with a unique grayscale shading or hatch pattern to visually distinguish among departments. In some embodiments, bar length may be proportional to a computed alignment score for the corresponding department. The alignment score may be calculated based on metrics derived from the structured feedback object, including salience-ranked contextual representations or category-matched feedback signals, as described with reference to FIG. 1.

In further reference to FIG. 2C, in an embodiment, alignment distribution module 254 may include a pie chart or radial chart configured to represent the distribution of alignment levels across departments. Each sector of the pie chart may correspond to a department and may be labeled with a department identifier and alignment percentage. In some embodiments, the visualization may use grayscale fill patterns, line weights, or legends to differentiate segments in non-color environments. The alignment percentages may reflect normalized values derived from the structured feedback object and stratified by department or team identifier.

Still referring to FIG. 2C, in an embodiment, alignment concerns module 255 may include a dynamically generated list of concern indicators based on thresholds applied to the alignment scores. For example, if a department's alignment score falls below a predetermined value (e.g., 70%), the system may surface a corresponding narrative insight. The insight may include an AI-generated summary of user input related to that department, derived from salience-weighted clustering of feedback responses. Optionally, alignment concerns module 255 may present system-generated recommendations, such as scheduling interventions or linking to underlying data, to support remediation.

In continued reference to FIG. 2C, in an embodiment, each of modules 253, 254, and 255 may be generated by applying a visualization schema to a subset of the structured feedback object. The subset may be determined based on user interaction context or interface module selection, and the visualization schema may specify rendering parameters, annotation rules, spatial layout, and encoding logic. In some cases, metadata contained in the structured feedback object may influence styling attributes such as priority flagging, threshold alerts, and temporal annotations. In further embodiments, the visualizations rendered in each of modules 253, 254, and 255 may differ not only in visual form (e.g., bar chart, pie chart, narrative list) but also in terms of the subset of the structured feedback object selected and the specific visualization schema applied. As described with reference to FIG. 1, the structured feedback object may include metadata-enriched representations of aggregated user responses, salience-ranked clusters, and contextual alignment scores computed across user groups. In this context, each visualization schema applied to interface 200*c* may define a unique set of extraction rules, formatting constraints, and rendering logic based on the intended informational goal of the corresponding module.

For example, department alignment module 253 may extract department-specific alignment scores and apply a schema optimized for comparative scalar display (e.g., horizontal bar alignment), while alignment distribution module 254 may apply a schema tailored for ratio-based visualization using circular sectors. In contrast, alignment concerns module 255 may rely on narrative summaries and threshold-based logic to generate bullet-pointed insights and alert-style visual indicators. These variations demonstrate how the system may selectively serialize and render subsets of structured feedback data based on schema-specific visualization requirements. Additionally, the visual alignment indicators, such as the bar lengths, pie chart segments, or flagged insights, may be graphically encoded as a function of metadata from the structured feedback object, including but not limited to salience scores, department identifiers, temporal tags, and severity annotations.

In continued reference to FIG. 2C, in some embodiments, the rendering of these module-specific visualizations may be performed by a rendering engine as described above, which may be configured to translate serialized subsets of the structured feedback object into graphical output elements compatible with the dynamic dashboard interface. The rendering engine may interpret metadata embedded within the structured feedback object, such as temporal validity windows, salience scores, or recipient group identifiers, to apply real-time visual formatting logic. For instance, in alignment concerns module 255, alert badges or color-coded priority indicators may be conditionally rendered when alignment scores fall below a predefined threshold or when sentiment volatility exceeds a context-sensitive baseline. Additionally, as described in reference to FIG. 1, these modules may incorporate alignment visualizations across distinct user groups. For example, department alignment module 253 may represent alignment scores for engineering, product, and design teams in parallel rows, each encoded with a different visual cue. In an embodiment, the at least a processor may dynamically update these visualizations in response to new input responses or configuration events, recalculating alignment scores and re-serializing updated subsets for rendering. In this way, interface 200*c* functions not as a static display, but as an adaptive presentation layer that reflects changes in feedback salience, participation coverage, or organizational structure in near real-time, consistent with the dynamic rendering logic and interface update processes described throughout this disclosure.

Figure 3:
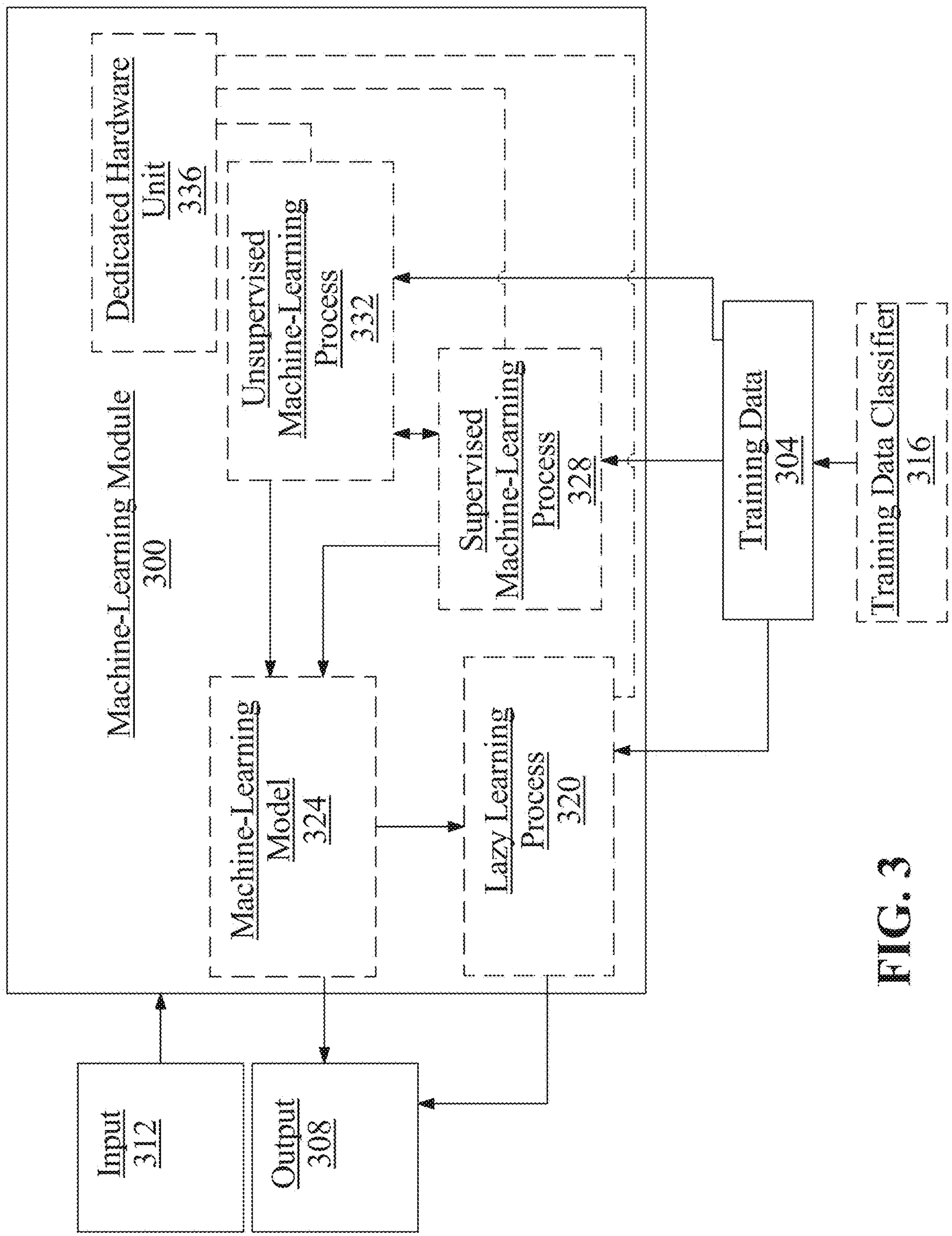
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure As a non-limiting illustrative example, the input data may include user-generated textual feedback collected from one or more user nodes (e.g., input responses), and the output data may include a structured feedback object annotated with salience values, prioritization scores, and one or more response clusters. In other embodiments, the input data may include system-level telemetry or configuration logs used to identify a candidate change signal, and the corresponding output may comprise an updated configuration model or a system change event classification. The training data may therefore enable the machine-learning model to learn mappings from unstructured and structured inputs to output representations that drive dashboard visualization, strategic surfacing of issues, and adaptive query generation.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to identify clusters associated with strategic relevance, such as feedback from users associated with high-priority roles (e.g., executive leadership or product managers), user segments contributing to critical strategic objectives, or patterns of concern affecting mission-critical processes. For instance, classifier 316 may be trained to assign input responses to sub-populations aligned with annual business plan pillars or 3-year strategic goals, thereby enabling the system to stratify response clusters by their potential impact on competitive advantage. These labels may be propagated downstream to modulate salience value weighting and prioritization score generation.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 3, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 3, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic “1” and “0” voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as “desired” results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A “dedicated hardware unit,” for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
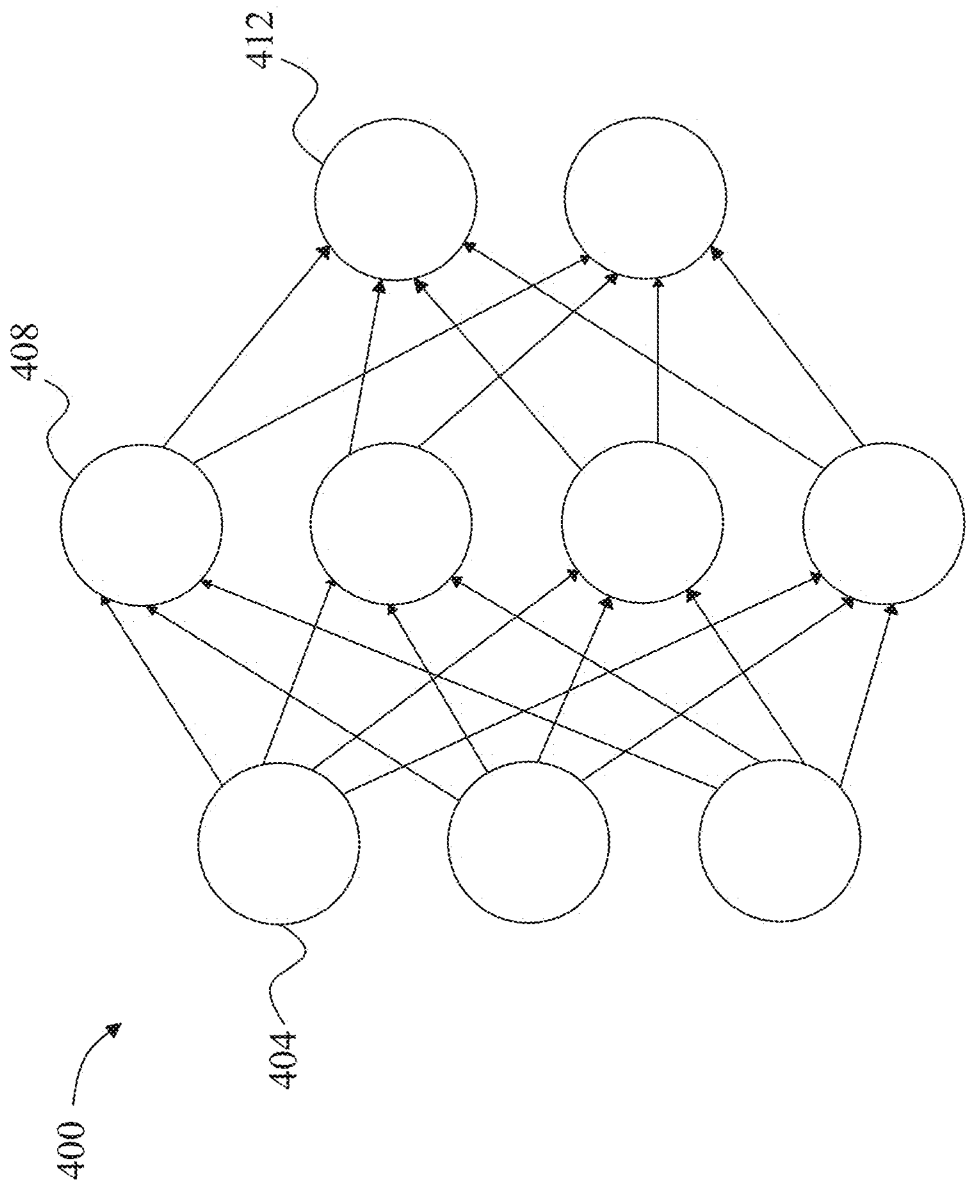
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
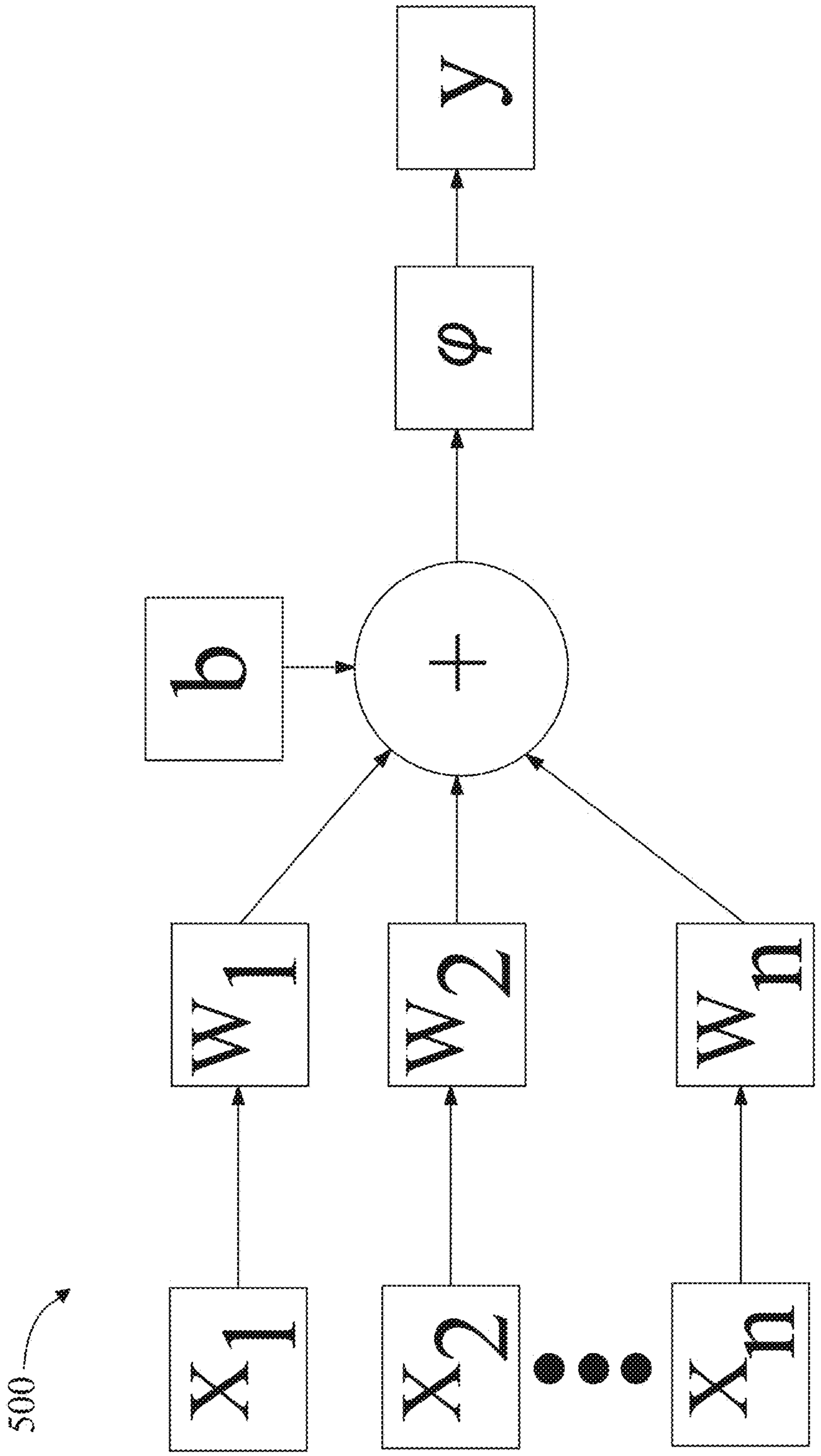
FIG. 5 is a diagram of an exemplary embodiment of a node of a neural network.

Referring now to FIG. 5, an exemplary embodiment of a node 500 of a neural network is illustrated. A node may include, without limitation a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dW}$$

where $w_{new}$ is the updated weight value, $w_{old}$ is the previous weight value, α is a parameter to set the learning rate, and $$\frac{dJ}{dW}$$

is the partial derivative of with respect to weight w.

Figure 6:
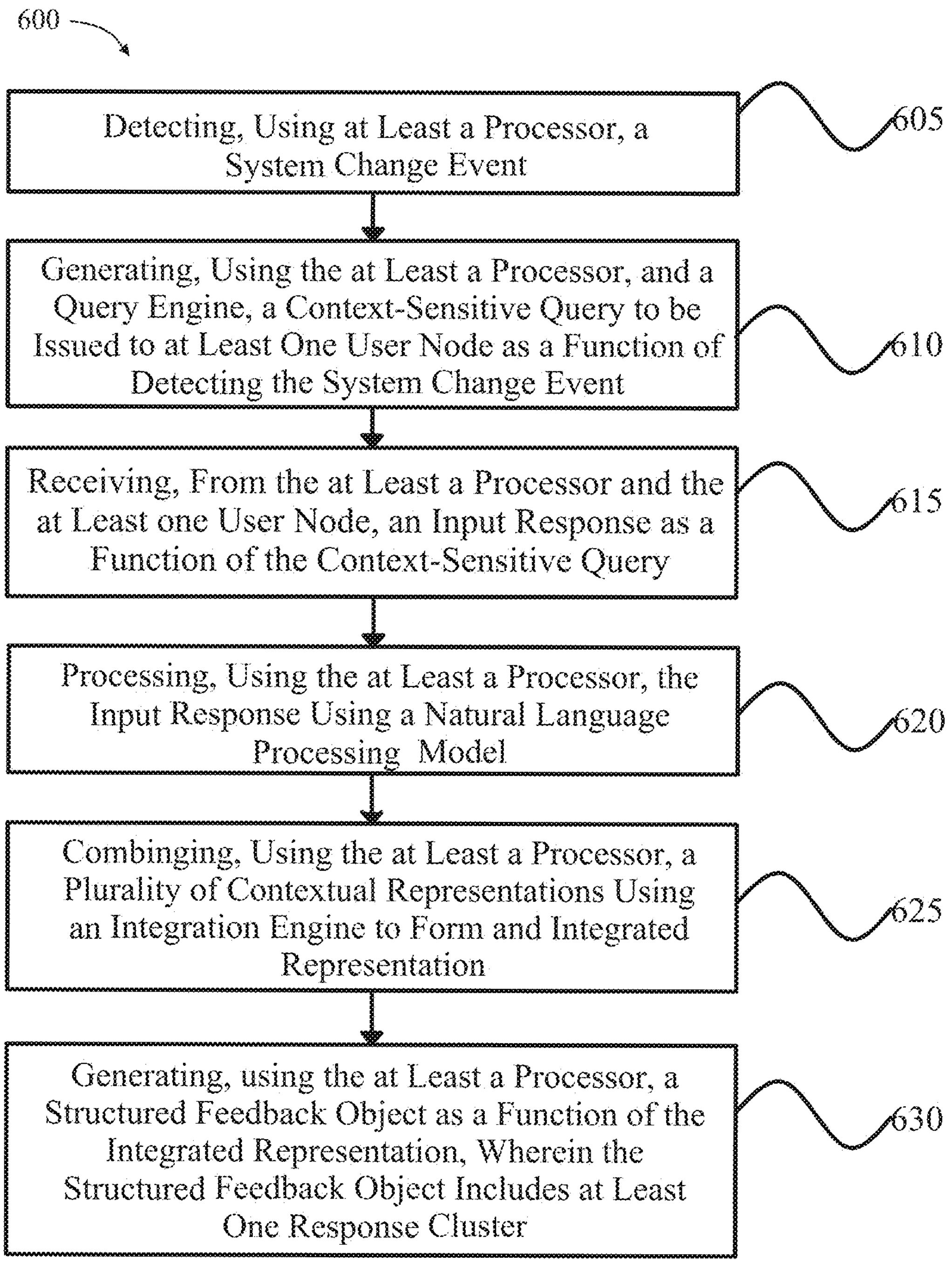
FIG. 6 is a flow diagram of an exemplary embodiment of a method for an adaptive feedback loop for distributed input processing and alignment prioritization in response to system-level changes.

Now referring to FIG. 6, a flow diagram of an exemplary method 600 for an adaptive feedback loop for distributed input processing and alignment prioritization in response to system-level changes is illustrated. Method 600 may include a step 605 of detecting, using at least a processor, a system change event. In an embodiment, detecting the system change event may include monitoring a system data source, identifying a candidate change signal from the system data source, wherein identifying the candidate change signal includes applying detection logic to at least one monitored data value from the system data source, analyzing the candidate change signal using a configuration model, and generating the system change event as a function of comparing the candidate change signal to a change detection threshold. This may be implemented, without limitation, as referenced in FIGS. 1-5.

In continued reference to FIG. 6, method 600 may include a step 610 of generating, using at least a processor and a query engine, a context-sensitive query to be issued to at least one user node as a function of detecting the system change event. In an embodiment, generating the context-sensitive query may include delaying issuance of the context-sensitive query for a dynamic time interval, wherein the dynamic time interval is determined as a function of applying a context modulation layer to the system change event. This may be implemented, without limitation, as referenced in FIGS. 1-5.

With further reference to FIG. 6, method 600 may include a step 615 of receiving, by the at least a processor and from the at least one user node, an input response as a function of the context-sensitive query. This may be implemented, without limitation, as referenced in FIGS. 1-5.

Still referring to FIG. 6, method 600 may include a step 620 of processing, using the at least a processor, the input response using a natural language processing model. In an embodiment, processing the input response using a natural language processing model may include normalizing the input response and segmenting a textual input of the input response into a sequence of units. In an embodiment, processing the input response using a natural language processing model may include converting the sequence of units into a sequence of embeddings using an embedding layer. In an embodiment, processing the input response using a natural language processing model may include passing the sequence of embeddings through at least one layer of a language model to generate a contextual representation of the textual input of the input response. In an embodiment, processing the input response may further include embedding structured data of the input response together with the sequence of units to form the sequence of embeddings. This may be implemented, without limitation, as referenced in FIGS. 1-5.

With further reference to FIG. 6, method 600 may further include combining, using the at least a processor, the contextual representation with structured data of the input response to form a unified representation. This may be implemented, without limitation, as referenced in FIGS. 1-5.

In further reference to FIG. 6, method 600 may include a step 625 of combining, using the at least a processor, a plurality of contextual representations using an integration engine to form an integrated representation. This may be implemented, without limitation, as referenced in FIGS. 1-5.

With continued reference to FIG. 6, method 600 may include a step 630 of generating, using the at least a processor, a structured feedback object as a function of the integrated representation. In an embodiment, the structured feedback object may include at least one response cluster. In an embodiment, the at least one response cluster may include a plurality of response clusters. For example, the plurality of response clusters may include a first response cluster and a second response cluster. This may be implemented, without limitation, as referenced in FIGS. 1-5.

In continued reference to FIG. 6, method 600 may include determining, using the at least a processor, a prioritization score for the at least one response cluster as a function of a salience value of the at least one response cluster. In an embodiment, determining the prioritization score for the at least one response cluster may include ranking the first response cluster against the second response cluster as a function of the salience value associated with each. In an embodiment, method 600 may further include calculating, using the at least a processor, the salience value of the at least one response cluster using a salience-ranking engine. This may be implemented, without limitation, as referenced in FIGS. 1-5.

Still referring to FIG. 6, method 600 may include displaying, using a dynamic dashboard interface, the structured feedback object as a function of a prioritization score. This may be implemented, without limitation, as referenced in FIGS. 1-5.

With further reference to FIG. 6, method 600 may include archiving, using the at least a processor, the structured feedback object and associated metadata and updating the query engine as a function of stored structured feedback and associated metadata. This may be implemented, without limitation, as referenced in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
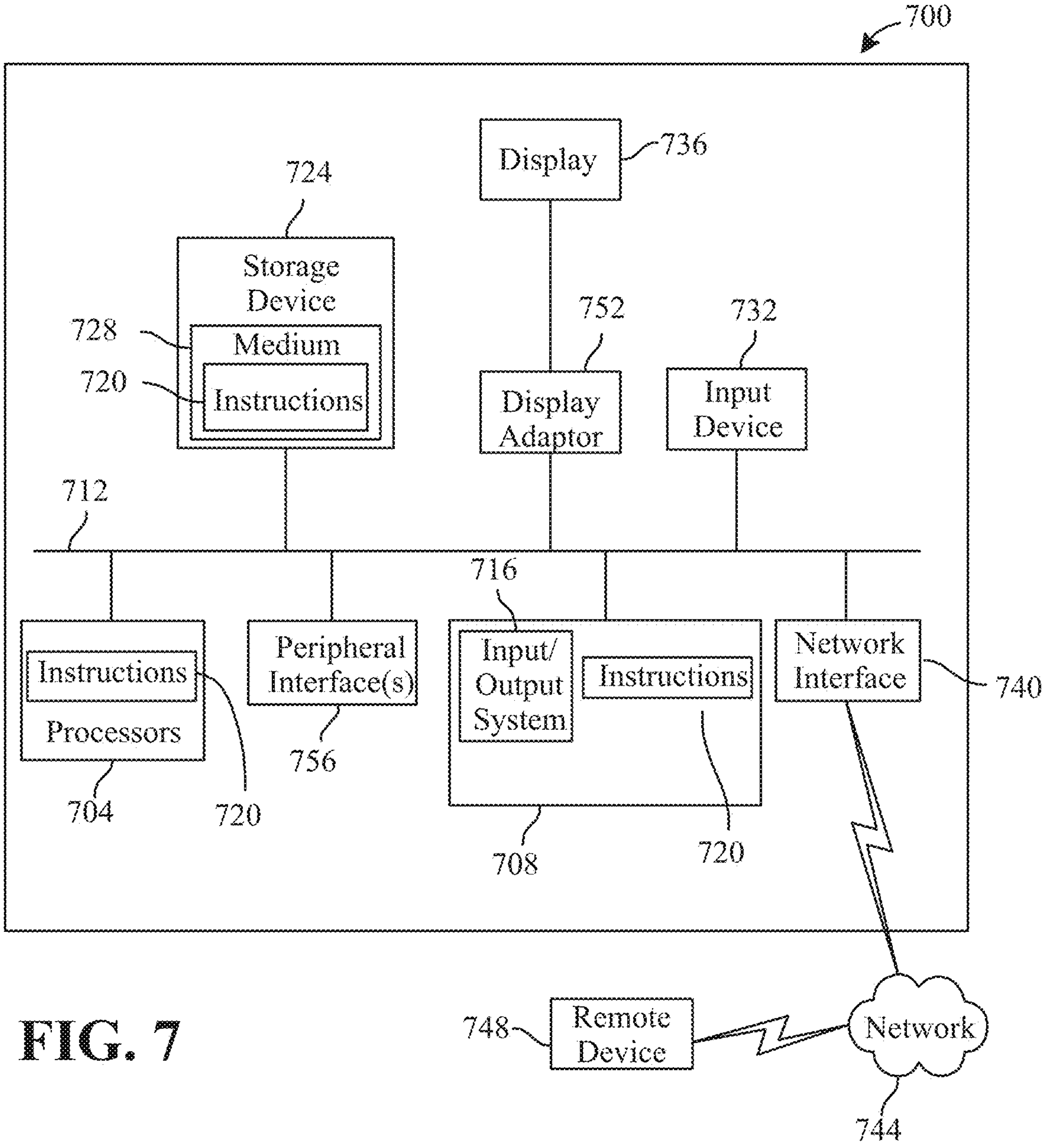
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for an adaptive feedback loop for distributed input processing and alignment prioritization in response to system-level changes, the system comprising:

at least a processor; and a memory communicatively connected to the at least a processor, the memory containing instructions configuring the at least a processor to:

detect a system change event;

generate, using a query engine, a context-sensitive query to be issued to at least one user node as a function of detecting the system change event;

receive, from the at least one user node, an input response as a function of the context-sensitive query;

process the input response using a natural language processing model, wherein processing the input response comprises:

normalizing the input response and segmenting a textual input of the input response into a sequence of units;

converting the sequence of units into a plurality of embeddings using an embedding layer; and passing the plurality of embeddings through at least one layer of a language model to generate a contextual representation of the textual input of the input response;

aggregate a plurality of contextual representations from two or more user nodes as a function of a distance between the plurality of embeddings;

generate a structured feedback object as a function of aggregating the plurality of contextual representations, wherein the structured feedback object comprises at least one response cluster; and display, using a dynamic dashboard interface, the structured feedback object as a function of a prioritization score, wherein displaying the structured feedback object comprises:

retrieving the structured feedback object;

extracting a subset of data elements as a function of a visualization schema associated with a selected graphical user interface module;

serializing the subset of data elements into a structured format compatible with a rendering engine; and rendering a graphical representation of the subset of data elements using the rendering engine, wherein visual attributes of the graphical representation are determined as a function of metadata contained in the structured feedback object.

2. The system of claim 1, wherein detecting the system change event comprises:

monitoring a system data source;

identifying a candidate change signal from the system data source, wherein identifying the candidate change signal comprises applying detection logic to at least one monitored data value from the system data source;

analyzing the candidate change signal using a configuration model; and generating the system change event as a function of comparing the candidate change signal to a change detection threshold.

3. The system of claim 1, wherein generating the context-sensitive query comprises delaying issuance of the context-sensitive query for a dynamic time interval, wherein determining the dynamic time interval comprises:

extracting event-specific metadata from the system change event;

classifying the event-specific metadata to an event category, wherein the event category comprises an optimal feedback window; and outputting the dynamic time interval as a function of the event category.

4. The system of claim 1, wherein processing the input response further comprises embedding structured data of the input response together with the sequence of units to form the plurality of embeddings.

5. The system of claim 1, wherein the at least a processor is further configured to combine the contextual representation with structured data of the input response to form a unified representation.

6. The system of claim 1, wherein the at least a processor is further configured to determine a prioritization score for the at least one response cluster as a function of a salience value of the at least one response cluster, wherein:

the at least one response cluster comprises a first response cluster and a second response cluster; and determining the prioritization score for the at least one response cluster comprises ranking the first response cluster against the second response cluster as a function of the salience value associated with each.

7. The system of claim 6, wherein the at least a processor is further configured to calculate the salience value of the at least one response cluster using a salience-ranking engine, wherein calculating the salience value for each response cluster comprises:

extracting, from the plurality of contextual representations within the response cluster, a plurality of salience features;

applying, using the salience-ranking engine, a scoring function to the plurality of salience features of each contextual representation of the plurality of contextual representations to generate individual salience scores;

aggregating the individual salience scores across the plurality of contextual representations, generating a composite salience value; and assigning the composite salience value to a respective cluster.

8. A method for an adaptive feedback loop for distributed input processing and alignment prioritization in response to system-level changes, the method comprising:

detecting, using at least a processor, a system change event;

generating, using at least a processor and a query engine, a context-sensitive query to be issued to at least one user node as a function of detecting the system change event;

receiving, by the at least a processor and from the at least one user node, an input response as a function of the context-sensitive query;

processing, using the at least a processor, the input response using a natural language processing model, wherein processing the input response comprises:

normalizing the input response and segmenting a textual input of the input response into a sequence of units;

converting the sequence of units into a plurality of embeddings using an embedding layer; and passing the plurality of embeddings through at least one layer of a language model to generate a contextual representation of the textual input of the input response;

aggregating, using the at least a processor, a plurality of contextual representations from two or more user nodes as a function of a distance between the plurality of embeddings;

generating, using the at least a processor, a structured feedback object as a function of aggregating the plurality of contextual representations, wherein the structured feedback object comprises at least one response cluster; and displaying, using a dynamic dashboard interface, the structured feedback object as a function of a prioritization score, wherein displaying the structured feedback object comprises:

retrieving the structured feedback object;

extracting a subset of data elements as a function of a visualization schema associated with a selected graphical user interface module;

serializing the subset of data elements into a structured format compatible with a rendering engine; and rendering a graphical representation of the subset of data elements using the rendering engine, wherein visual attributes of the graphical representation are determined as a function of metadata contained in the structured feedback object.

9. The method of claim 8, wherein detecting the system change event comprises:

monitoring a system data source;

identifying a candidate change signal from the system data source, wherein identifying the candidate change signal comprises applying detection logic to at least one monitored data value from the system data source;

analyzing the candidate change signal using a configuration model; and generating the system change event as a function of comparing the candidate change signal to a change detection threshold.

10. The method of claim 8, wherein generating the context-sensitive query comprises delaying issuance of the context-sensitive query for a dynamic time interval, wherein determining the dynamic time interval comprises:

extracting event-specific metadata from the system change event;

classifying the event-specific metadata to an event category, wherein the event category comprises an optimal feedback window; and outputting the dynamic time interval as a function of the event category.

11. The method of claim 8, wherein processing the input response further comprises embedding structured data of the input response together with the sequence of units to form the plurality of embeddings.

12. The method of claim 8, further comprising combining, using the at least a processor, the contextual representation with structured data of the input response to form a unified representation.

13. The method of claim 8, further comprising determining, using the at least a processor, a prioritization score for the at least one response cluster as a function of a salience value of the at least one response cluster, wherein:

the at least one response cluster comprises a first response cluster and a second response cluster; and determining the prioritization score for the at least one response cluster comprises ranking the first response cluster against the second response cluster as a function of the salience value associated with each.

14. The method of claim 13, further comprising calculating, using the at least a processor, the salience value of the at least one response cluster using a salience-ranking engine, wherein calculating the salience value comprises:

extracting, from the plurality of contextual representations within the response cluster, a plurality of salience features;

applying, using the salience-ranking engine, a scoring function to the plurality of salience features of each contextual representation of the plurality of contextual representations to generate individual salience scores;

aggregating the individual salience scores across the plurality of contextual representations, generating a composite salience value; and assigning the composite salience value to a respective cluster.

15. A system for an adaptive feedback loop for distributed input processing and alignment prioritization in response to system-level changes, the system comprising:

at least a processor; and a memory communicatively connected to the at least a processor, the memory containing instructions configuring the at least a processor to:

detect a system change event;

generate, using a query engine, a context-sensitive query to be issued to at least one user node as a function of detecting the system change event;

receive, from the at least one user node, an input response as a function of the context-sensitive query;

process the input response using a natural language processing model, wherein processing the input response comprises:

normalizing the input response and segmenting a textual input of the input response into a sequence of units;

converting the sequence of units into a plurality of embeddings using an embedding layer; and passing the plurality of embeddings through at least one layer of a language model to generate a contextual representation of the textual input of the input response;

aggregate a plurality of contextual representations from two or more user nodes as a function of a distance between the plurality of embeddings;

generate a structured feedback object as a function of aggregating the plurality of contextual representations, wherein the structured feedback object comprises at least one response cluster; and display, using a dynamic dashboard interface, the structured feedback object as a function of a prioritization score, wherein displaying the structured feedback object comprises rendering an alignment visualization within the dynamic dashboard interface, wherein:

alignment visualization is related to at least two groups of user nodes; and the at least a processor is further configured to:

compute for each group of the at least two groups of user nodes, an alignment score as a function of the plurality of contextual representations associated with each group of the at least two groups of user nodes; and encode the alignment score for each group of the at least two groups of user nodes as a graphical element within a visualization schema associated with the alignment visualization.

16. A method for an adaptive feedback loop for distributed input processing and alignment prioritization in response to system-level changes, the method comprising:

detecting, using at least a processor, a system change event;

generating, using at least a processor and a query engine, a context-sensitive query to be issued to at least one user node as a function of detecting the system change event;

receiving, by the at least a processor and from the at least one user node, an input response as a function of the context-sensitive query;

processing, using the at least a processor, the input response using a natural language processing model, wherein processing the input response comprises:

normalizing the input response and segmenting a textual input of the input response into a sequence of units;

converting the sequence of units into a plurality of embeddings using an embedding layer; and passing the plurality of embeddings through at least one layer of a language model to generate a contextual representation of the textual input of the input response;

aggregating, using the at least a processor, a plurality of contextual representations from two or more user nodes as a function of a distance between the plurality of embeddings;

generating, using the at least a processor, a structured feedback object as a function of aggregating the plurality of contextual representations, wherein the structured feedback object comprises at least one response cluster; and displaying, using a dynamic dashboard interface, the structured feedback object as a function of a prioritization score, wherein displaying the structured feedback object comprises rendering an alignment visualization within the dynamic dashboard interface, wherein:

alignment visualization is related to at least two groups of user nodes; and the method further comprises:

computing for each group of the at least two groups of user nodes, an alignment score as a function of the plurality of contextual representations associated with each group of the at least two groups of user nodes; and encoding the alignment score for each group of the at least two groups of user nodes as a graphical element within a visualization schema associated with the alignment visualization.

* * * * *